(12) United States Patent
Niitsuma et al.

(10) Patent No.: US 8,911,519 B2
(45) Date of Patent: Dec. 16, 2014

(54) METHOD AND APPARATUS FOR HYDROGEN PRODUCTION AND CARBON DIOXIDE RECOVERY

(75) Inventors: Takuya Niitsuma, Yokohama (JP); Shunsuke Maekawa, Yokohama (JP); Yoshihiro Kobori, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 915 days.

(21) Appl. No.: 12/669,947

(22) PCT Filed: Jul. 25, 2008

(86) PCT No.: PCT/JP2008/063403
§ 371 (c)(1),
(2), (4) Date: Jan. 20, 2010

(87) PCT Pub. No.: WO2009/017054
PCT Pub. Date: Feb. 5, 2009

(65) Prior Publication Data
US 2010/0260657 A1    Oct. 14, 2010

(30) Foreign Application Priority Data

Jul. 27, 2007 (JP) .................................. 2007-196348
Jul. 27, 2007 (JP) .................................. 2007-196349
Jul. 27, 2007 (JP) .................................. 2007-196401

(51) Int. Cl.
| | |
|---|---|
| *B01J 7/00* | (2006.01) |
| *C01B 3/50* | (2006.01) |
| *C01B 3/38* | (2006.01) |
| *B01D 53/22* | (2006.01) |
| *C01B 3/48* | (2006.01) |

(52) U.S. Cl.
CPC .............. *B01D 53/226* (2013.01); *C01B 3/505* (2013.01); *C01B 3/384* (2013.01);
(Continued)

(58) Field of Classification Search
CPC ............ C01B 2203/0475; C01B 3/501; C01B 2203/0405; C01B 2203/041; C01B 3/503; C01B 3/505
See application file for complete search history.

(56) References Cited

U.S. PATENT DOCUMENTS 5,073,356 A * 12/1991 Guro et al. ................. 423/418.2
5,229,102 A    7/1993 Minet et al.
(Continued)

FOREIGN PATENT DOCUMENTS

JP    S52-54695 A    5/1977
JP    H06-263402 A    9/1994
(Continued)

OTHER PUBLICATIONS

European Search Report, dated Oct. 27, 2010, in European Application 08791647.4.
(Continued)

*Primary Examiner* — Imran Akram
(74) *Attorney, Agent, or Firm* — Fitch, Even, Tabin & Flannery LLP

(57) ABSTRACT

There are provided methods and apparatus allowing effective production of high purity hydrogen and recovery of carbon dioxide. There is disclosed a method of hydrogen production and carbon dioxide recovery for producing hydrogen and recovering carbon dioxide from a carbon-containing fuel, the method including a membrane separation reforming step of, with the use of a reformer provided with a hydrogen-permeable membrane, reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane, and the method further comprising: with the use of a hydrogen separation membrane and a carbon dioxide separation membrane, treating the reformer off-gas to obtain a hydrogen-enriched gas and a carbon dioxide-enriched gas; or subjecting the reformer off-gas to a shift reaction and then separating the resulting gas into a carbon dioxide-enriched gas and a gas enriched in components other than carbon dioxide. Also disclosed is an apparatus for carrying out the method.

5 Claims, 7 Drawing Sheets

(52) U.S. Cl.
CPC ....... *B01D 2256/22* (2013.01); *C01B 2203/043* (2013.01); *C01B 2203/146* (2013.01); *B01D 2317/08* (2013.01); *B01D 2256/16* (2013.01); *C01B 2203/1247* (2013.01); *C01B 2203/1223* (2013.01); *C01B 2203/141* (2013.01); *C01B 3/48* (2013.01); *B01D 2257/504* (2013.01); *C01B 3/386* (2013.01); *C01B 2203/0233* (2013.01); *C01B 2203/0405* (2013.01); *C01B 2203/1258* (2013.01); *C01B 2203/1241* (2013.01); *C01B 2203/0244* (2013.01); *Y02C 10/10* (2013.01); *C01B 2203/1064* (2013.01); *C01B 2203/107* (2013.01); *C01B 2203/0261* (2013.01); *B01D 2317/022* (2013.01); *B01D 2257/108* (2013.01); *C01B 2203/0415* (2013.01); *C01B 2203/1058* (2013.01); *C01B 2203/86* (2013.01); *C01B 2203/0283* (2013.01); *C01B 2203/148* (2013.01); *C01B 2203/0465* (2013.01); *C01B 2203/1229* (2013.01); *C01B 2203/041* (2013.01); *C01B 3/382* (2013.01)
USPC ........................................................ 48/61

(56) References Cited

U.S. PATENT DOCUMENTS

| | | | | |
|---|---|---|---|---|
| 5,435,836 | A * | 7/1995 | Anand et al. | 95/45 |
| 6,572,837 | B1 | 6/2003 | Holland et al. | |
| 7,981,171 | B2 * | 7/2011 | Fedorov et al. | 48/118.5 |
| 2005/0123810 | A1 | 6/2005 | Balan | |
| 2006/0172161 | A1 * | 8/2006 | Ueda et al. | 429/20 |
| 2007/0180991 | A1 * | 8/2007 | Chellappa et al. | 96/4 |
| 2007/0240565 | A1 * | 10/2007 | Doong et al. | 95/45 |
| 2007/0264186 | A1 * | 11/2007 | Dybkjaer et al. | 423/418.2 |
| 2007/0269690 | A1 * | 11/2007 | Doshi et al. | 429/19 |
| 2008/0000350 | A1 * | 1/2008 | Mundschau et al. | 95/56 |
| 2009/0117024 | A1 | 5/2009 | Weedon et al. | |
| 2011/0177410 | A1 * | 7/2011 | Assink et al. | 429/425 |

FOREIGN PATENT DOCUMENTS

| | | |
|---|---|---|
| JP | H06-345408 A | 12/1994 |
| JP | 2002-321904 A | 11/2002 |
| JP | 2004-248565 A | 9/2004 |
| WO | WO 00/22690 A1 | 4/2000 |
| WO | WO 2006/050531 A | 5/2006 |
| WO | WO 2006/097703 A1 | 9/2006 |

OTHER PUBLICATIONS

G. Chiappetta et al., "Design of an integrated membrane system for a high level hydrogen purification", Chemical Engineering Journal, Elsevier, vol. 124, No. 1-3, Nov. 1, 2006, pp. 29-40.

A. Corti et al., "Carbon dioxide removal in power generation using membrane technology", Energy, Pergamon Press, Oxford, vol. 29, No. 12-15, Oct. 1, 2004, pp. 2025-2043.

K. Jordal et al., "Integration of H2-separating membrane technology in gas turbine processes for CO2 capture", Energy, Pergamon Press, Oxford, vol. 29, No. 9-10, Jul. 1, 2004, pp. 1269-1278, XP-002515891.

Office Action dated Jul. 11, 2011, issued in counterpart European Patent Application 08791647.4.

International Search Report dated Sep. 16, 2008.

Powell, C. E., et al., "Polymeric $CO_2/N_2$ gas separation membranes for the capture of carbon dioxide from power plant flue gases", Journal of Membrane Science, 279, pp. 1-49, 2006.

Heisei 15 (2003), Accomplishment Reports on Key Technology Research and Development Programs of Molecular Gate Functionalized Membrane for $CO_2$ Separation.

Office Action dated Apr. 3, 2012 issued against European Application No. 11 166 661.6.

* cited by examiner

METHOD AND APPARATUS FOR HYDROGEN PRODUCTION AND CARBON DIOXIDE RECOVERY

CROSS-REFERENCE TO RELATED APPLICATIONS

This application is the U.S. national phase application UNDER 35 U.S.C. 371 of International Application No. PCT/JP2008/063403, filed Jul. 25, 2008, which designated the United States, and claims foreign priority from Japanese Patent Application No.: JP 2007-196348, filed Jul. 27, 2007, Japanese Patent Application No.: JP 2007-196349, filed Jul. 27, 2007 and Japanese Patent Application No. JP2008-196401, filed Jul. 27, 2007, the entire disclosures of the aforesaid applications are hereby incorporated herein by reference in their entirety for all purposes.

TECHNICAL FIELD

The present invention relates to methods and apparatus for producing hydrogen and recovering carbon dioxide from a carbon-containing fuel such as fossil fuels.

BACKGROUND ART

Hydrogen is expected as a future energy medium and active research and development have been done in a wide range of technical fields, such as production, storage and transportation, and use. The advantages using hydrogen as an energy medium include high energy utilization efficiency and the fact that a waste after combustion is only water.

Under the present circumstances, about 80% of primary energy is occupied by fossil fuels, such as petroleum, coal, and natural gas, and even though it will gradually decrease by the increase of use of renewable energy and the like from now on, it is expected that the high ratio will be maintained. Therefore, in the production of hydrogen, it can be said that, as a source of primary energy, the importance of the route using a fossil fuel as a raw material will not decrease for the time being.

A method of obtaining high purity hydrogen by performing a reforming reaction while extracting hydrogen using a hydrogen-permeable membrane such as Pd in a reformer for reforming fossil fuels is known as a method in which high purity hydrogen is obtained with simple apparatus (Patent Documents 1 and 2).

Such technology is effective in efficiently obtaining high purity hydrogen, but carbon dioxide is by-produced. Reduction of $CO_2$ emission is said to be an urgent and important issue for preventing global warming. In such a situation, a technology for separating and recovering $CO_2$ which is by-produced when hydrogen is produced from a fossil fuel is important as a technology capable of coping with both the reduction of $CO_2$ emission and the early realization of the hydrogen society.

Patent Document 3 discloses a method in which a hydrogen-permeable membrane is used in a reformer for fossil fuels and produced carbon dioxide is separated. However, since carbon dioxide is separated by allowing it to be absorbed by an absorbent made of an alkaline compound, a complicated step with low energy efficiency was required, such as a step in which steam is used to provide heat for recovering carbon dioxide from the absorbent.

Patent Document 1: Japanese Patent Laid-Open No. H06-263402
Patent Document 2: Japanese Patent Laid-Open No. H06-345408
Patent Document 3: Japanese Patent Laid-Open No. 2002-321904

DISCLOSURE OF THE INVENTION

Problems to be Solved by the Invention

An object of the present invention is to provide a method and apparatus capable of effectively producing high purity hydrogen and recovering carbon dioxide.

Means for Solving the Problems

The present invention provides the following method and apparatus.

A method of hydrogen production and carbon dioxide recovery for producing hydrogen and recovering carbon dioxide from a carbon-containing fuel, the method comprising:

a membrane separation reforming step of, with the use of a reformer provided with a hydrogen-permeable membrane, reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane, and the method further comprising:

with the use of a hydrogen separation membrane and a carbon dioxide separation membrane, treating the reformer off-gas to thereby obtain a gas enriched in hydrogen and a gas enriched in carbon dioxide; or subjecting the reformer off-gas to a shift reaction and thereafter separating a gas which underwent the shift reaction into a gas enriched in carbon dioxide and a gas enriched in components other than carbon dioxide.

An apparatus of hydrogen production and carbon dioxide recovery for producing hydrogen and recovering carbon dioxide from a carbon-containing fuel, the apparatus comprising:

a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane, and the apparatus further comprising:

a hydrogen separation membrane and a carbon dioxide separation membrane for treating the reformer off-gas to obtain a gas enriched in hydrogen and a gas enriched in carbon dioxide; or a shift reactor for subjecting the reformer off-gas to a shift reaction and a carbon dioxide separator for separating a gas obtained from the shift reactor into a gas enriched in carbon dioxide and a gas enriched in components other than carbon dioxide.

The present invention further provides methods and apparatus according to an embodiment (embodiment A) of the present invention.

[A1] A method of hydrogen production and carbon dioxide recovery for producing hydrogen and recovering carbon dioxide from a carbon-containing fuel, the method comprising:

a membrane separation reforming step of, with the use of a reformer provided with a hydrogen-permeable membrane, reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a carbon dioxide membrane separation step of, with the use of a carbon dioxide separation membrane, separating the reformer off-gas into a carbon dioxide-enriched gas which is a gas enriched in carbon dioxide and a carbon dioxide separation membrane off-gas which is a gas enriched in components other than carbon dioxide; and a hydrogen membrane separation step of, with the use of a hydrogen separation membrane, separating the carbon dioxide separation membrane off-gas into a hydrogen-enriched gas which is a gas enriched in hydrogen and a hydrogen separation membrane off-gas which is a gas enriched in components other than hydrogen.

[A2]
The method according to [A1], including liquefying the carbon dioxide-enriched gas to obtain liquefied carbon dioxide.

[A3]
The method according to [A1] or [A2], including recycling the hydrogen-enriched gas to the membrane separation reforming step.

[A4]
The method according to any one of [A1] to [A3], wherein the carbon dioxide separation membrane has a ratio α of carbon dioxide permeability coefficient to hydrogen permeability coefficient of 5 or more.

[A5]
An apparatus of hydrogen production and carbon dioxide recovery for producing hydrogen and recovering carbon dioxide from a carbon-containing fuel, the apparatus comprising:

a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a carbon dioxide separation membrane for separating the reformer off-gas into a carbon dioxide-enriched gas which is a gas enriched in carbon dioxide and a carbon dioxide separation membrane off-gas which is a gas enriched in components other than carbon dioxide; and a hydrogen separation membrane for separating the carbon dioxide separation membrane off-gas into a hydrogen-enriched gas which is a gas enriched in hydrogen and a hydrogen separation membrane off-gas which is a gas enriched in components other than hydrogen.

[A6]
The apparatus according to [A5], including a carbon dioxide liquefier for liquefying the carbon dioxide-enriched gas to obtain liquefied carbon dioxide.

[A7]
The apparatus according to [A5] or [A6], including a recycle line for recycling the hydrogen-enriched gas to the membrane separation reforming step.

[A8]
The apparatus according to any one of [A5] to [A7], wherein the carbon dioxide separation membrane has a ratio α of carbon dioxide permeability coefficient to hydrogen permeability coefficient of 5 or more.

The present invention further provides methods and apparatus according to another embodiment (embodiment B) of the present invention.

[B1]
A method of hydrogen production and carbon dioxide recovery for producing hydrogen and recovering carbon dioxide from a carbon-containing fuel, the method comprising:

a membrane separation reforming step of, with the use of a reformer provided with a hydrogen-permeable membrane, reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a hydrogen membrane separation step of, with the use of a hydrogen separation membrane, separating the reformer off-gas into a hydrogen-enriched gas which is a gas enriched in hydrogen and a hydrogen separation membrane off-gas which is a gas enriched in components other than hydrogen; and a carbon dioxide membrane separation step of, with the use of a carbon dioxide separation membrane, separating the hydrogen separation membrane off-gas into a carbon dioxide-enriched gas which is a gas enriched in carbon dioxide and a carbon dioxide separation membrane off-gas which is a gas enriched in components other than carbon dioxide.

[B2]
The method according to [B1], including liquefying the carbon dioxide-enriched gas to obtain liquefied carbon dioxide.

[B3]
The method according to [B1] or [B2], including recycling the hydrogen-enriched gas to the membrane separation reforming step.

[B4]
The method according to any one of [B1] to [B3], wherein the carbon dioxide separation membrane has a ratio α of carbon dioxide permeability coefficient to hydrogen permeability coefficient of 5 or more.

[B5]
The method according to any one of [B1] to [B4], wherein the carbon dioxide separation membrane has a ratio α of carbon dioxide permeability coefficient to hydrogen permeability coefficient of 100 or less.

[B6]
An apparatus of hydrogen production and carbon dioxide recovery for producing hydrogen and recovering carbon dioxide from a carbon-containing fuel, the apparatus comprising:

a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a hydrogen separation membrane for separating the reformer off-gas into a hydrogen-enriched gas which is a gas enriched in hydrogen and a hydrogen separation membrane off-gas which is a gas enriched in components other than hydrogen; and a carbon dioxide separation membrane for separating the hydrogen separation membrane off-gas into a carbon dioxide-enriched gas which is a gas enriched in carbon dioxide and a carbon dioxide separation membrane off-gas which is a gas enriched in components other than carbon dioxide.

[B7]

The apparatus according to [B6], including a carbon dioxide liquefier for liquefying the carbon dioxide-enriched gas to obtain liquefied carbon dioxide.

[B8]

The apparatus according to [B6] or [B7], including a recycle line for recycling the hydrogen-enriched gas to the membrane separation reforming step.

[B9]

The apparatus according to any one of [B6] to [B8], wherein the carbon dioxide separation membrane has a ratio α of carbon dioxide permeability coefficient to hydrogen permeability coefficient of 5 or more.

[B10]

The apparatus according to any one of [B6] to [B9], wherein the carbon dioxide separation membrane has a ratio α of carbon dioxide permeability coefficient to hydrogen permeability coefficient of 100 or less.

The present invention further provides methods and apparatus according to further another embodiment (embodiment C) of the present invention.

[C1]

A method of hydrogen production and carbon dioxide recovery for producing hydrogen and recovering carbon dioxide from a carbon-containing fuel, the method comprising:

a membrane separation reforming step of, with the use of a reformer provided with a hydrogen-permeable membrane, reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a shift reaction step of subjecting the reformer off-gas to a shift reaction; and a carbon dioxide separation step of separating a gas which underwent the shift reaction step into a gas enriched in carbon dioxide and a carbon dioxide separation off-gas which is a gas enriched in components other than carbon dioxide.

[C2]

The method according to [C1], wherein in the carbon dioxide separation step, the separation is performed using a carbon dioxide separation membrane which selectively permeates carbon dioxide.

[C3]

The method according to [C2], wherein the carbon dioxide separation membrane has a ratio α of carbon dioxide permeability coefficient to hydrogen permeability coefficient of 5 or more.

[C4]

The method according to any one of [C1] to [C3], including a hydrogen separation step of, with the use of a hydrogen separation membrane which selectively permeates hydrogen, separating a gas obtained from the shift reaction step into a hydrogen-enriched gas which is a gas enriched in hydrogen and a hydrogen separation off-gas which is a gas enriched in components other than hydrogen, wherein, in the carbon dioxide separation step, the hydrogen separation off-gas is used as the gas which underwent the shift reaction step.

[C5]

The method according to any one of [C1] to [C3], wherein in the carbon dioxide separation step, a gas obtained from the shift reaction step is used as the gas which underwent the shift reaction step, including a hydrogen separation step of, with the use of a hydrogen separation membrane which selectively permeates hydrogen, separating the carbon dioxide separation off-gas into a hydrogen-enriched gas which is a gas enriched in hydrogen and a hydrogen separation off-gas which is a gas enriched in components other than hydrogen.

[C6]

An apparatus of hydrogen production and carbon dioxide recovery for producing hydrogen and recovering carbon dioxide from a carbon-containing fuel, the apparatus including:

a membrane separation reformer which is a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane;

a shift reactor for subjecting the reformer off-gas to a shift reaction; and a carbon dioxide separator for separating a gas which underwent the shift reaction step into a gas enriched in carbon dioxide and a carbon dioxide separation membrane off-gas which is a gas enriched in components other than carbon dioxide.

[C7]

The apparatus according to [C6], wherein the carbon dioxide separator includes a carbon dioxide separation membrane which selectively permeates carbon dioxide.

[C8]

The apparatus according to [C7], wherein the carbon dioxide separation membrane has a ratio α of carbon dioxide permeability coefficient to hydrogen permeability coefficient of 5 or more.

[C9]

The apparatus according to any one of [C6] to [C8], including a hydrogen separation membrane which selectively permeates hydrogen for separating a gas obtained from the shift reaction step into a hydrogen-enriched gas which is a gas enriched in hydrogen and a hydrogen separation off-gas which is a gas enriched in components other than hydrogen, wherein the carbon dioxide separator separates the hydrogen separation off-gas.

[C10]

The apparatus according to any one of [C6] to [C8], wherein the carbon dioxide separator separates a gas obtained from the shift reaction step, including a hydrogen separation membrane which selectively permeates hydrogen for separating the carbon dioxide separation off-gas into a hydrogen-enriched gas which is a gas enriched in hydrogen and a hydrogen separation off-gas which is a gas enriched in components other than hydrogen.

Advantages of the Invention

The present invention provides methods and apparatus capable of effectively producing high purity hydrogen and recovering carbon dioxide.

DESCRIPTION OF SYMBOLS

Figure 1:
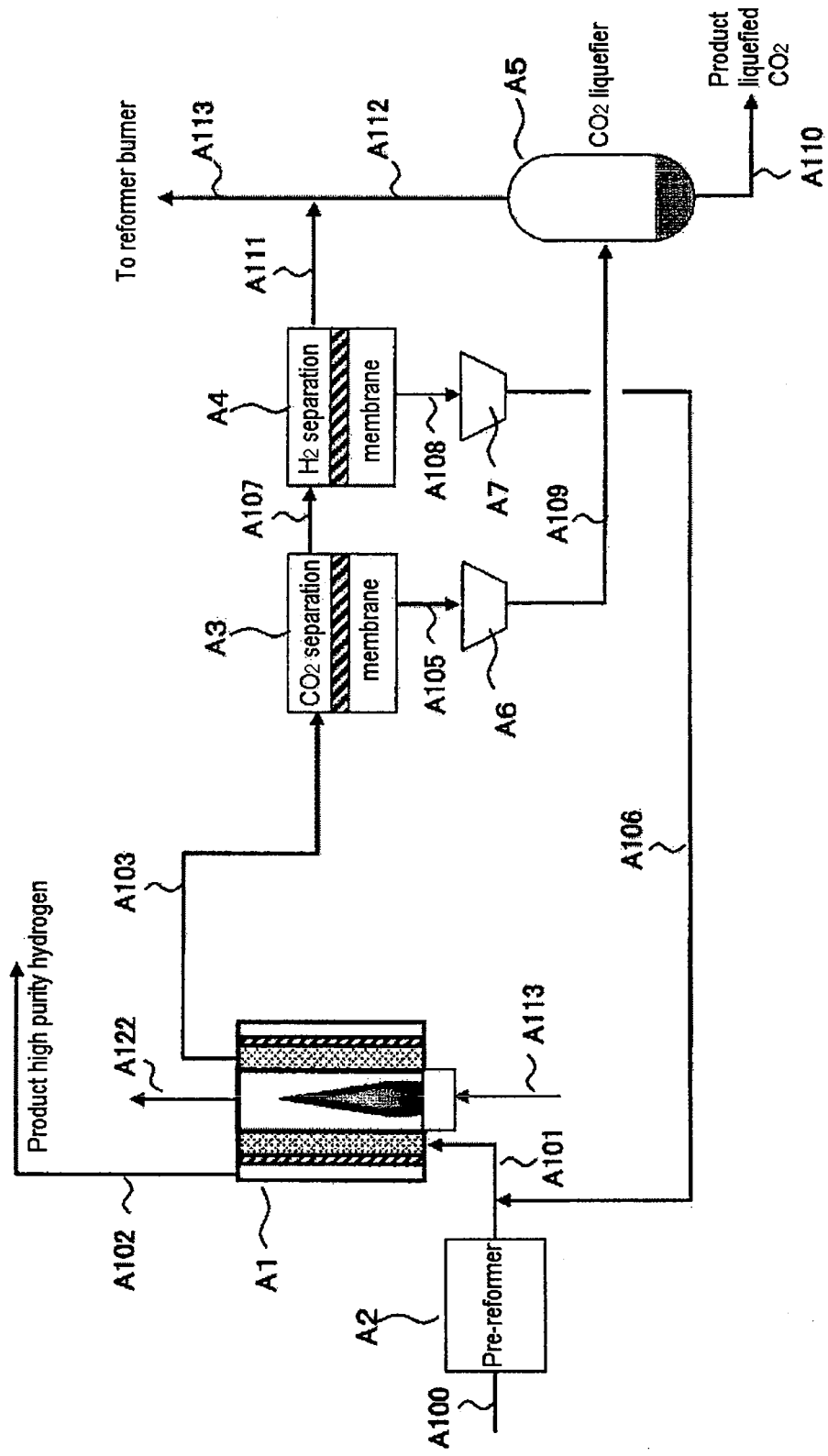
FIG. 1 is a flow diagram for illustrating the outline of an example of an apparatus which can implement the present invention (embodiment A)

1$a$: Combustion part
1$b$: Reforming reaction tube
1$c$: Hydrogen separation membrane
1$d$: Hydrogen channel
1$e$: Burner
201: Outer annular part
202: Inner tube part
203: Wall separating outer annular part and inner tube part
A1: Membrane separation reformer
A2: Pre-reformer
A3: Carbon dioxide separation membrane
A4: Hydrogen separation membrane
A5: Carbon dioxide liquefier
A6: Pressure booster
A7: Pressure booster
B1: Membrane separation reformer
B2: Pre-reformer
B3: Hydrogen separation membrane
B4: Carbon dioxide separation membrane
B5: Carbon dioxide liquefier
B6: Pressure booster
B7: Pressure booster
C1: Membrane separation reformer
C2: Pre-reformer
C3: Shift reactor
C4: Hydrogen separation membrane
C5: Carbon dioxide separation membrane
C6: Carbon dioxide liquefier
C7: Pressure booster
C8: Pressure booster

BEST MODE FOR CARRYING OUT THE INVENTION

Unless otherwise specified, in the present specification, pressures are absolute pressures, and % related to gas composition means mol % calculated with excluding steam.

[Carbon-Containing Fuel]

In the present invention, a carbon-containing fuel which is a fuel containing carbon is used as a raw material for producing hydrogen. A carbon-containing fuel may be appropriately selected for use from substances which contain carbon and can produce a hydrogen-containing gas by way of reforming.

Examples of the carbon-containing fuel include fossil fuels. Fossil fuels mean a fuel which can be produced by using fossil resources such as petroleum, coal, and natural gas as a raw material, which may be in any form, including gas, liquid, and solid. Specific examples include hydrocarbons such as methane, ethane, propane, natural gas, liquefied petroleum gas, naphtha, gasoline, kerosene, light oil, and heavy oil. Natural gas, liquefied petroleum gas, naphtha, and kerosene are particularly preferably used. Oxygen-containing compounds such as methanol, dimethyl ether, and ethanol, which can be produced from fossil fuels and contain an oxygen atom in the molecule, may be used suitably as a carbon-containing fuel. In addition, those substances, including hydrocarbons and oxygen-containing compounds, which are not produced from fossil resources such as ethanol obtained from bio resources may also be used as a carbon-containing fuel.

[Membrane Separation Reforming Step]

In a membrane separation reforming step, the carbon-containing fuel undergoes reforming reaction and hydrogen is simultaneously separated by a hydrogen-permeable membrane, thus obtaining a hydrogen-permeable membrane permeated gas which is a gas having permeated the hydrogen-permeable membrane and a reformer off-gas which is a gas not having permeated the hydrogen-permeable membrane. For this purpose, there is used a reformer (membrane separation reformer) provided with a hydrogen-permeable membrane capable of selectively permeating hydrogen.

The hydrogen-permeable membrane permeated gas has higher hydrogen concentration than the reformer off-gas. The hydrogen-permeable membrane permeated gas may be product hydrogen. The reformer off-gas contains carbon monoxide and carbon dioxide because it is a gas obtained by separating hydrogen from a reformed gas which is obtained by reforming the carbon-containing fuel.

As a reforming process, known processes such as a steam reforming process, autothermal reforming, and a partial oxidation process can be employed. However, in order to facilitate a following carbon dioxide separation step, a process in which nitrogen in the air is not mixed is preferred. Therefore, a steam reforming process, or autothermal reforming or a partial oxidation process using pure oxygen as an oxidizing agent is preferably employed, and a steam reforming process may be particularly preferably employed.

First, the case where hydrocarbons such as natural gas, liquefied petroleum gas, naphtha, and kerosene are used as a carbon-containing fuel will be described. In a steam reforming process, hydrocarbons are reacted with water preferably at a temperature of from 300° C. to 1000° C., more preferably from 400° C. to 900° C., and at a pressure of preferably from 0.2 MPa to 10 MPa, more preferably from 0.5 MPa to 2 MPa to be decomposed into a reformed gas containing hydrogen, carbon monoxide, carbon dioxide, and methane. The mixing ratio of water to hydrocarbons in terms of S/C (the ratio of number of moles of steam to that of carbon atoms in a carbon-containing fuel) is set in the range of preferably from 2 to 7, more preferably from 2.5 to 4. When S/C is 2 or more, coking will be easily suppressed, and degradation of a catalyst and a hydrogen separation membrane to be described below will be easily suppressed. On the other hand, S/C is preferably 7 or less from the viewpoint of suppressing the amount of steam to save energy consumption.

In the steam reforming reaction, a catalyst is generally used. As the catalyst, a known steam-reforming catalyst may be used. Examples of the catalyst include Group 8, 9, and 10 metals of the Periodic Table such as nickel, ruthenium, rhodium, and platinum. The selection of these metals may be appropriately determined in comprehensive consideration of a raw material, reaction conditions, and the like. Also in the case of autothermal reforming and a partial oxidation process, a catalyst may be employed by appropriately selecting it from known catalysts that can be used for these reforming processes.

On the other hand, also in the case of using oxygen-containing compounds such as methanol, dimethyl ether, and ethanol as a carbon-containing fuel, substantially the same processes as described above can be applied. In this case, the amount of water used in terms of S/C is in the range of preferably 1.5 to 4, more preferably 1.5 to 2.5. Particularly, when methanol or dimethyl ether is used, it is possible to achieve excellent hydrogen yield by using a copper-zinc-based catalyst or the like as a catalyst and reacting at 400° C. or less, preferably 350° C. or less where carbon monoxide equilibrium concentration is low.

In the present invention, a part or the whole of the above reforming reaction is performed in the presence of a hydrogen separation membrane using a membrane separation reformer.

As a hydrogen-permeable membrane used for the membrane separation reformer, a membrane may be employed by appropriately selecting it from known hydrogen-permeable membranes that can be used for the membrane separation reformer. It is particularly preferred to employ a membrane which provides high purity hydrogen having a purity of 99% or more, preferably 99.9% or more, more preferably 99.99% or more. Examples of usable membranes include a hydrogen-permeable membrane made of Pd or an alloy containing Pd such as Pd—Ag and Pd—Cu, and a non-Pd-based hydrogen-permeable membrane made of an alloy containing metal such as V, Nb, Ni, and Ti. It is also possible to use membranes made of zeolite, porous silica, porous boron nitride, and the like.

The permeation-side pressure of the membrane is lower than the hydrogen pressure on the feed-side, and is preferably in the range of 0.2 MPa or less, more preferably from 0.001 MPa to 0.1 MPa.

The reformer off-gas obtained in the membrane separation reforming step is, for example, a mixed gas consisting of 25 to 60% hydrogen, 3 to 20% carbon monoxide, 25 to 65% carbon dioxide, and 3 to 20% methane.

When performing the reforming reaction, particularly when the presence of fossil fuels having a C—C bond may have an adverse effect on the characteristics of a hydrogen-permeable membrane, it is possible to separate the reforming reaction into two steps, wherein most of the fossil fuels having a C—C bond are decomposed in the first step to obtain a mixed gas containing methane, and then the reforming reaction is further advanced in the presence of a hydrogen-permeable membrane in the second step. In this case, a reformer (pre-reformer) provided with no hydrogen-permeable membrane may be arranged upstream of a reformer provided with a hydrogen-permeable membrane.

A catalyst which can be used for the pre-reformer may be the same as the catalyst which can be used for the membrane separation reformer. Examples of the catalyst include Group 8, 9, and 10 metals of the Periodic Table such as nickel, ruthenium, rhodium, and platinum. The selection of these metals may be appropriately determined in comprehensive consideration of a raw material, reaction conditions, and the like. The reaction conditions include a temperature of preferably from 300° C. to 1000° C., more preferably from 400° C. to 900° C., and a pressure of preferably from 0.2 MPa to 10 MPa, more preferably from 0.5 MPa to 2 MPa. The mixing ratio of water to hydrocarbons in terms of S/C (the ratio of number of moles of steam to that of carbon atoms in a carbon-containing fuel) is set in the range of preferably 2 to 7, more preferably 2.5 to 4.

Note that, when a carbon-containing fuel contains sulfur, the carbon-containing fuel can be fed to the reformer after it is desulfurized, in order to prevent the catalyst poisoning by sulfur.

Figure 2:
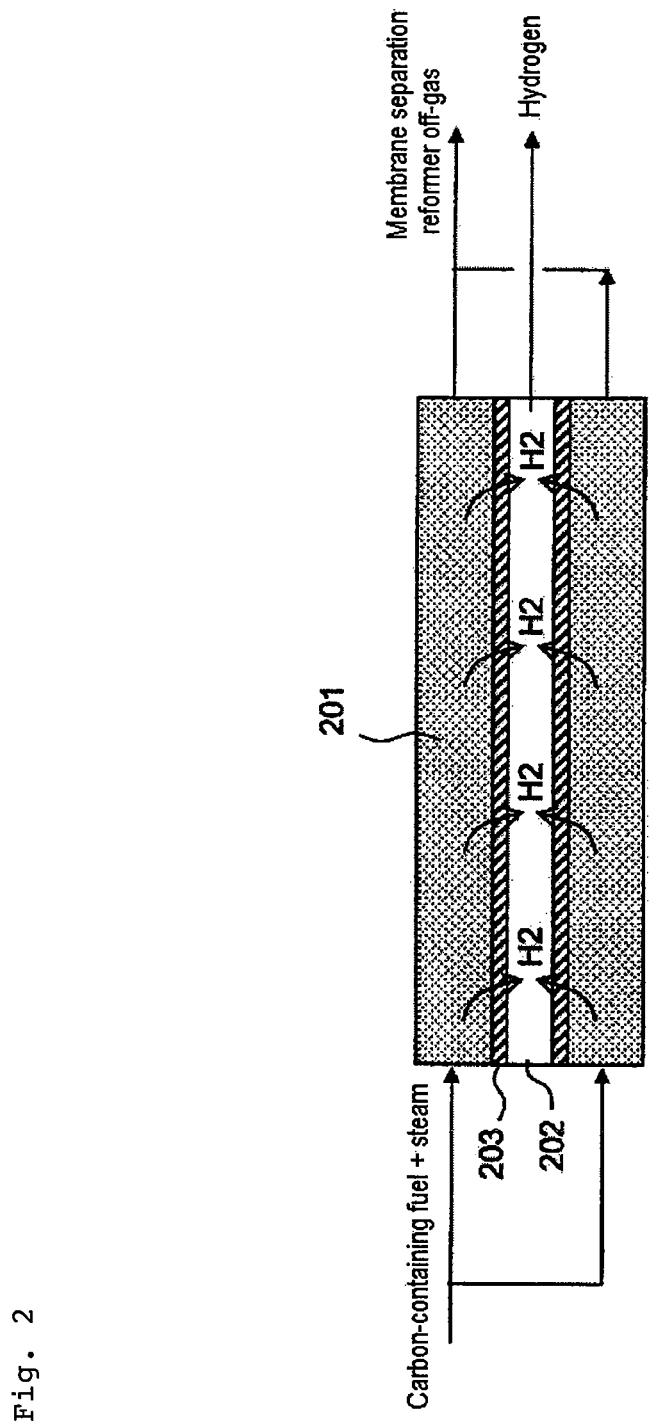
FIG. 2 is a schematic sectional view showing an example of the structure of a membrane separation reformer.

As the membrane separation reformer, a reformer which can perform reforming while separating hydrogen from a reforming reaction field can be appropriately employed. For example, a reforming reaction tube having a double tube structure, particularly a reforming reaction tube having a double circular tube structure, may be used. In this case, as shown in FIG. 2, it is possible to provide a reforming catalyst layer in an outer annular part 201 of a reforming reaction tube, use an inner tube part 202 as a channel (discharge passage) of separated hydrogen, and use at least a part of a wall 203 separating the outer annular part and the inner tube part as a hydrogen-permeable membrane. When a carbon-containing fuel, steam required for the reforming reaction, and the like are fed to the outer annular part, the reforming reaction will occur in the reforming catalyst layer in the outer annular part, and hydrogen will be produced. A part of the produced hydrogen permeates the hydrogen-permeable membrane and is withdrawn from the inner tube part. Since the reforming reaction occurs along the flow of reformed gas while separating hydrogen, it is possible to very effectively produce hydrogen and obtain high purity hydrogen by membrane separation. The reformed gas from which hydrogen is separated is withdrawn as reformer off-gas. The heat required for reforming may be supplied by flowing a high-temperature fluid such as combustion gas of a burner to the outside of the reforming reaction tube.

Structures other than the double tube structure may be employed. For example, it is possible to employ a structure in which a plate-shaped reforming catalyst layer is provided in a plate-shaped channel; a plate-shaped hydrogen channel is provided adjacent to the plate-shaped channel; and a hydrogen-permeable membrane is arranged between these channels.

Alternatively, as will be described in detail below with reference to FIG. 3, it is also possible to use a reformer having a three-fold tube structure, wherein the outermost annular part is used as a channel for permeated hydrogen; a reforming catalyst layer is provided in the inner annular part; and combustion is performed in the innermost region.

Embodiment A

Hereinafter, embodiment A which is an embodiment of the present invention will be described in detail. In this embodiment, a membrane separation reforming step, a carbon dioxide membrane separation step, and a hydrogen membrane separation step are performed in this order. Note that membrane separation reforming is performed in each embodiment in the same manner as described above.

[Carbon Dioxide Membrane Separation Step]

The present invention allows the carbon dioxide contained in the reformer off-gas to be recovered in a form suitable for storage. Thus, in the carbon dioxide membrane separation step, a membrane which selectively permeates carbon dioxide is used to separate the reformer off-gas into a gas enriched in carbon dioxide (carbon dioxide-enriched gas) and a gas enriched in components other than carbon dioxide (carbon dioxide separation membrane off-gas) not having permeated the membrane.

The gas discharged from the membrane separation reformer may be introduced into the carbon dioxide membrane separation step as it is without pressurization. The feed-side pressure in the carbon dioxide membrane separation step can be about the same as the pressure on the reforming side (the side on which hydrogen does not permeate) of the membrane separation reformer.

As a carbon dioxide separation membrane, a membrane may be employed by appropriately selecting from among known membranes capable of selectively permeating $CO_2$. Examples thereof include a polymer material membrane as described in Journal of Membrane Science, 276, 1-49 (2006) by Powell et al., a dendrimer membrane as described in "Heisei 15 (2003) Fiscal Year Projects of Measures for Fixation of Carbon Dioxide and Technology in its Effective Utilization, International Projects for Promoting Global Environmental Research, Accomplishment Reports on Key Technology Research and Development Programs of Molecular Gate Functionalized Membrane for $CO_2$ Separation", an amine group-containing membrane as described in WO2006/050531, and an inorganic material membrane including a zeolite membrane.

From the viewpoint of the separation efficiency of carbon dioxide, the carbon dioxide separation membrane has a ratio of carbon dioxide permeability coefficient to hydrogen permeability coefficient (permeability coefficient ratio) a of preferably 5 or more, more preferably 10 or more, further preferably 20 or more. On the other hand, the upper limit of a is not particularly limited since it is generally the higher the better, but it is enough if it is about 1000.

Here, the ratio $\alpha$ of $CO_2$ permeability coefficient to hydrogen permeability coefficient is defined by the following formula.

$$\alpha=\text{(permeability coefficient of carbon dioxide)}/\text{(permeability coefficient of hydrogen)}$$

Here, the permeability coefficient of each component is defined by the following formula, wherein Q represents the gas permeation rate of each component; p1 represents feed-side pressure (partial pressure); p2 represents permeation-side pressure (partial pressure); A represents the area of the membrane; and L represents the thickness of the membrane.

$$Q=\text{(permeability coefficient)}/L\times(p1-p2)A$$

The shape of the separation membrane is not particularly limited even if any material is used, but any shape such as a planar, tubular, or hollow fiber shape may be selected.

The permeation-side pressure in the carbon dioxide membrane separation step is set at a lower pressure than the feed-side pressure and may be the atmospheric pressure or less. It is preferably selected in the range of from 0.0001 MPa to 0.5 MPa, more preferably from 0.001 to 0.2 MPa.

The operation temperature of membrane separation is set at a temperature suitable for a membrane material to be used.

Carbon dioxide can be recovered as a carbon dioxide-enriched gas in this way. The recovered carbon dioxide-enriched gas may be stored, for example, by being injected into the ground as it is, but it is preferably processed in a $CO_2$ liquefying step to produce liquefied $CO_2$. Therefore, the $CO_2$ concentration of the carbon dioxide-enriched gas is preferably increased so as to facilitate the smooth operation of the $CO_2$ liquefying step, and the concentration is preferably 70% or more, more preferably 80% or more, further preferably 90% or more. When the $CO_2$ concentration is 70% or more, the energy required for the liquefying step can be reduced, and the percentage of the liquefied $CO_2$ to be recovered can be increased.

Note that the components other than carbon dioxide contained in the carbon dioxide-enriched gas are, for example, 0.5 to 20% hydrogen, 0.01 to 5% carbon monoxide, and 0.01 to 5% methane.

Further, the carbon dioxide separation membrane off-gas contains, for example, 20 to 70% hydrogen, 5 to 30% carbon dioxide, 3 to 20% carbon monoxide, and 5 to 30% methane.

As a method for liquefying $CO_2$, it is possible to appropriately employ a known $CO_2$ liquefying method such as a method of using a Joule-Thomson effect, a method of cooling by external cold energy while compressing, or the like. Also as a carbon dioxide liquefier, it is possible to appropriately select and use known device which can liquefy carbon dioxide by any of these known $CO_2$ liquefying methods. The liquefied $CO_2$ obtained in this way is first transported to a storage site by an appropriate method such as land transportation, marine transportation, or a pipeline, and then may be insulated underground or undersea or may be used as various raw materials for synthesizing chemicals or the like because it has high $CO_2$ concentration. Since the off-gas obtained from the $CO_2$ liquefying step (gas not having been liquefied) still contains combustible gases such as hydrogen and methane, it may be sent to a reformer burner for use as a fuel.

[Hydrogen Membrane Separation Step]

In the hydrogen membrane separation step, a membrane which selectively permeates hydrogen is used to separate the carbon dioxide separation membrane off-gas into a gas enriched in hydrogen (hydrogen-enriched gas) and a gas enriched in components other than hydrogen (hydrogen separation membrane off-gas) not having permeated the membrane. Since the carbon dioxide separation membrane off-gas is a gas not having permeated the carbon dioxide separation membrane, the pressure drop in the carbon dioxide membrane separation step is small. Therefore, since it is not necessary to pressurize the carbon dioxide separation membrane off-gas again when it is introduced into the hydrogen membrane separation step, hydrogen can be concentrated without consuming additional energy. That is, it is possible to achieve further effective use of hydrogen and improve hydrogen yield while suppressing energy loss. The feed-side pressure in the hydrogen membrane separation step can be about the same as the feed-side pressure in the carbon dioxide membrane separation step.

As the hydrogen separation membrane used in the hydrogen membrane separation step, a known membrane capable of selectively permeating hydrogen can be appropriately selected and employed. Examples of the hydrogen separation membrane include metal membranes such as palladium, polymer membranes such as polyimide, and porous membranes such as porous silica, zeolite, and porous carbon. Polymer membranes are preferably used from the viewpoint of easiness of operation, cost, and the like.

The hydrogen separation membrane has a ratio $\alpha$ of carbon dioxide permeability coefficient to hydrogen permeability coefficient of preferably from 0 to 0.5, more preferably from 0 to 0.3, further preferably from 0 to 0.15. The ratio $\alpha$ of the hydrogen separation membrane is the smaller the better, but it is substantially enough if it is about 0.001.

The shape of the separation membrane is not particularly limited even if any material is used, and any shape such as a planar, tubular, or hollow fiber shape may be selected.

The permeation-side pressure in the hydrogen membrane separation step is set at a lower pressure than the feed-side pressure and may be the atmospheric pressure or less. It is preferably selected in the range of from 0.0001 MPa to 0.5 MPa, more preferably from 0.001 to 0.1 MPa.

The operation temperature of membrane separation is set at a temperature suitable for a membrane material to be used. For example, the suitable temperature is in the range of from 250 to 500° C. for a palladium membrane, and it is in the range of from room temperature to 150° C. for a polyimide membrane.

The hydrogen-enriched gas contains, for example, 70 to 99% hydrogen, 1 to 20% carbon dioxide, 0 to 5% carbon monoxide, and 0 to 5% methane, when a polymer membrane such as a polyimide membrane is used.

On the other hand, the hydrogen separation membrane off-gas contains, for example, 1 to 50% hydrogen, 10 to 60% carbon dioxide, 1 to 20% carbon monoxide, and 1 to 30% methane.

The hydrogen separation membrane off-gas may be fed to a combustion means such as a burner of the reformer in the membrane separation reforming step for use as a fuel.

On the other hand, since the hydrogen-enriched gas has relatively high hydrogen concentration, it may be appropriately pressurized and then recycled upstream of the membrane separation reforming step in order to recover hydrogen. For this purpose, it is possible to use a recycle line through which the hydrogen-enriched gas (permeation-side outlet gas of the hydrogen separation membrane) is recycled to the inlet of the membrane separation reformer. The yield of hydrogen can be improved by this measure. Also, methane in the hydrogen-enriched gas can be converted to hydrogen.

[Process]

Hereinafter, a suitable process to implement the embodiment A will be described with reference to drawings, but the present invention is not limited thereby.

FIG. 1 shows an example of a basic configuration of suitable apparatus to implement this embodiment. FIG. 3 shows a schematic sectional view of a membrane separation reformer A1 provided in this apparatus.

Figure 3:
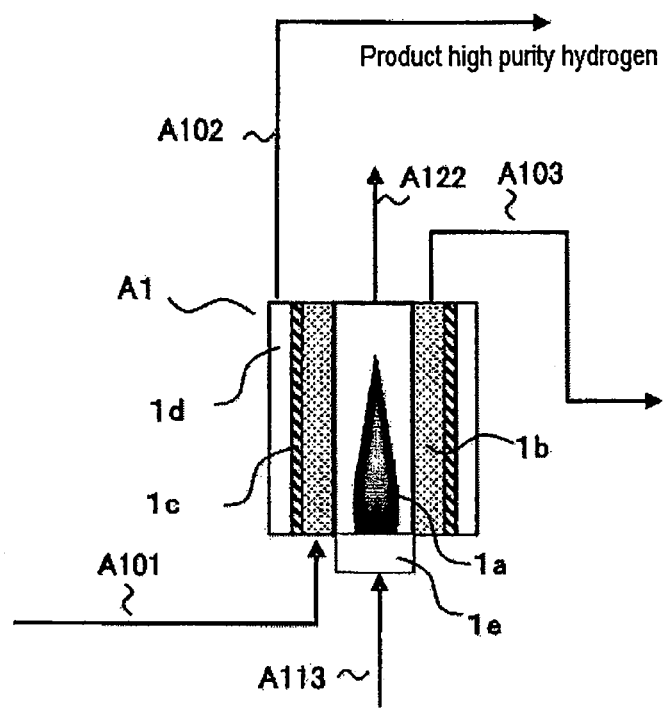
FIG. 3 is a schematic sectional view showing another example of the structure of a membrane separation reformer.

A membrane separation reformer A1 provided with a Pd membrane has a three-fold tube structure, as shown in FIG. 3. This reformer includes as its constituent elements, from the inside, a combustion part $1a$ for burning a fuel, a reforming reaction tube $1b$ (inner annular part) equipped with a reforming catalyst for performing steam reforming reaction of a carbon-containing fuel, a hydrogen-permeable membrane $1c$ consisting of a membrane which constitutes a part of the wall of the reforming reaction tube and is mainly composed of Pd, and a hydrogen channel $1d$ (outermost annular part) into which the hydrogen permeated the hydrogen-permeable membrane flows. Further, a burner $1e$ is connected to the combustion part $1a$.

The carbon-containing fuel is fed from a line A100 through a line A101 to a reformer A1, particularly, to a reforming reaction tube. Particularly when a carbon-containing fuel having a carbon-carbon bond is used, it is possible to install a pre-reformer A2 upstream of introducing the fuel into the membrane separation reformer to reduce the content of a component containing a carbon-carbon bond in the carbon-containing fuel for the purpose of preventing carbon deposition on the hydrogen-permeable membrane and the like.

Steam, oxygen, and the like required for the reforming reaction are appropriately fed to the reformer (not shown). When the carbon-containing fuel is a liquid or a solid, the carbon-containing fuel can be appropriately evaporated beforehand. If needed, the carbon-containing fuel may be desulfurized in a desulfurizer (not shown) before it is fed to the reformer.

The carbon-containing fuel is decomposed into a gas containing hydrogen by the effect of a reforming catalyst inside the reforming reaction tube $1b$. At this time, a part of hydrogen passes through the hydrogen-permeable membrane $1c$ and flows through the space $1d$ and a line A102 to yield the hydrogen-permeable membrane permeated gas (high purity hydrogen) as product hydrogen.

A gas that does not pass the hydrogen-permeable membrane $1c$ of the reformer A1 (gas having a higher concentration of components other than hydrogen compared with the high purity hydrogen), that is, reformer off-gas, is fed to a $CO_2$ separation membrane A3 through a line A103. The $CO_2$-enriched gas (gas enriched in carbon dioxide) which permeated the $CO_2$ separation membrane is introduced into a $CO_2$ liquefier A5 through a line A105 and a compressor A6 (line A109).

Product liquefied carbon dioxide is recovered from the carbon dioxide liquefier (line A110). Unliquefied gas (line A112) discharged from the carbon dioxide liquefier joins the hydrogen separation membrane off-gas (line A111). The resulting mixed gas is fed to the burner $1e$ from a line A113 and burns, and the combustion gas is exhausted from a line A122. The heat of combustion is used to heat the reforming reaction tube.

The $CO_2$ separation membrane off-gas (gas enriched in components other than carbon dioxide) not having permeated the $CO_2$ separation membrane is introduced into a hydrogen separation membrane A4 from a line A107. A hydrogen-enriched gas (line A108) is obtained as a gas permeated the hydrogen separation membrane, which is boosted in pressure with a pressure booster A7 and recycled upstream of the reformer A1 (line A106). The hydrogen separation membrane off-gas (gas enriched in components other than hydrogen) discharged without permeating the hydrogen separation membrane joins the $CO_2$ liquefier off-gas (line A112) through the line A111. The resulting mixed gas is sent to the reformer burner $1e$ from the line A113 and used as a fuel therefor.

According to the present embodiment A, it is first possible to very efficiently withdraw high purity hydrogen in the membrane separation reforming step. After separating hydrogen in this way, carbon dioxide is separated from the gas containing carbon dioxide discharged from the membrane separation reforming step. Therefore, carbon dioxide can be efficiently separated. Further, a larger amount of hydrogen can be recovered by separating hydrogen from the carbon dioxide separation membrane off-gas. If the separated hydrogen is recycled to the membrane separation reformer, the yield of hydrogen can be further improved. The membrane separation reforming step, the carbon dioxide membrane separation step, and the hydrogen membrane separation step can be performed under approximately the same pressure without boosting pressure between these steps. Therefore, increase of energy consumption can also be suppressed.

Embodiment B

Hereinafter, embodiment B which is another embodiment of the present invention will be described in detail. In the present embodiment, a membrane separation reforming step, a hydrogen membrane separation step, and a carbon dioxide membrane separation step are performed in this order.

[Hydrogen Membrane Separation Step]

The present invention allows hydrogen contained in a reformer off-gas to be effectively used and carbon dioxide to be recovered in a form suitable for storage. By performing the hydrogen membrane separation step before the carbon dioxide membrane separation step, $CO_2$ concentration in a gas fed to the carbon dioxide separation membrane can be increased beforehand. This enables efficient recovery of carbon dioxide even if the $CO_2$ selectivity of the carbon dioxide separation membrane is not so high.

Thus, in the hydrogen membrane separation step, a membrane which selectively permeates hydrogen is used to separate the reformer off-gas into a gas enriched in hydrogen (hydrogen-enriched gas) and a gas enriched in components other than hydrogen (hydrogen separation membrane off-gas) not having permeated the membrane.

The gas discharged from the membrane separation reformer can be introduced into the hydrogen membrane separation step as it is without boosting pressure. The feed-side pressure in the hydrogen membrane separation step may be about the same as the pressure on the reforming side (the side on which hydrogen does not permeate) of the membrane separation reformer.

As the hydrogen separation membrane, a known membrane capable of selectively permeating hydrogen can be appropriately selected and employed. Examples thereof are the same as those described for embodiment A.

The shape of the separation membrane is not particularly limited even if any material is used, and any shape such as a planar, tubular, or hollow fiber shape may be selected.

The hydrogen separation membrane has a ratio $\alpha$ of carbon dioxide permeability coefficient to hydrogen permeability coefficient (permeability coefficient ratio) of preferably from 0 to 0.5, more preferably from 0 to 0.3, further preferably from 0 to 0.15. The ratio $\alpha$ of the hydrogen separation membrane is the smaller the better, but it is substantially enough if it is about 0.001.

Here, the ratio $\alpha$ of carbon dioxide permeability coefficient to hydrogen permeability coefficient is defined as described above.

The permeation-side pressure for the membrane separation in the hydrogen membrane separation step is set at a lower pressure than the feed-side pressure and may be the atmospheric pressure or less. It is preferably selected in the range of from 0.0001 MPa to 0.5 MPa, more preferably from 0.001 to 0.1 MPa.

The operation temperature of membrane separation is set at a temperature suitable for a membrane material to be used. For example, the suitable temperature is in the range of from 250 to 500° C. for a palladium membrane, and it is in the range of from room temperature to 150° C. for a polyimide membrane.

The hydrogen-enriched gas obtained in this way contains, for example, 50 to 99% hydrogen, 1 to 40% carbon dioxide, 0 to 10% carbon monoxide, and 0 to 10% methane, when a polymer membrane such as a polyimide membrane is used. Thus, 10 to 99% of the hydrogen contained in the reformer off-gas can be recovered.

The hydrogen-enriched gas obtained in the hydrogen membrane separation step can be appropriately boosted in pressure and then recycled upstream of the membrane separation reforming step. For this purpose, it is possible to use a recycle line through which the hydrogen-enriched gas is recycled to the inlet of the membrane separation reformer. The yield of hydrogen can be improved by this measure. Methane in the hydrogen-enriched gas may be converted to hydrogen. Alternatively, the hydrogen-enriched gas may be introduced into a combustion means such as a burner provided in the reformer and discharged to the outside after the combustibles in the hydrogen-enriched gas are burned in the combustion means.

On the other hand, the hydrogen separation membrane off-gas contains, for example, 5 to 50% hydrogen, 30 to 70% carbon dioxide, 1 to 30% carbon monoxide, and 1 to 30% methane.

[Carbon Dioxide Membrane Separation Step]

In the carbon dioxide membrane separation step, a separation membrane having $CO_2$ selectivity is used to separate the hydrogen separation membrane off-gas into a gas enriched in $CO_2$ (carbon dioxide-enriched gas) and a gas enriched in components other than $CO_2$ (carbon dioxide separation membrane off-gas) not having permeated the membrane.

Since the hydrogen separation membrane off-gas is a gas not having permeated the hydrogen separation membrane, the pressure drop in the hydrogen membrane separation step is small. Therefore, since it is not necessary to pressure-boost the hydrogen separation membrane off-gas again when it is introduced into the carbon dioxide membrane separation step, $CO_2$ can be concentrated without consuming additional energy. Further, a $CO_2$ separation membrane having an extremely good performance is not required because the hydrogen separation membrane off-gas has a high $CO_2$ concentration, allowing reduction in the load of membrane separation in the carbon dioxide membrane separation step. This provides an effect of being able to reduce cost, and the like. The feed-side pressure in the carbon dioxide membrane separation step may be about the same as the feed-side pressure in the hydrogen membrane separation step.

As the carbon dioxide separation membrane used in the carbon dioxide membrane separation step, a known membrane capable of selectively permeating carbon dioxide may be appropriately selected and employed. Examples thereof are the same as those described for embodiment A.

The shape of the separation membrane is not particularly limited even if any material is used, and any shape such as a planar, tubular, or hollow fiber shape may be selected.

From the viewpoint of the separation efficiency of carbon dioxide, the carbon dioxide separation membrane has a ratio $\alpha$ of $CO_2$ permeability coefficient to hydrogen permeability coefficient of preferably 5 or more, more preferably 10 or more, further preferably 20 or more. On the other hand, according to the present invention, $CO_2$ separation can be well performed without using a carbon dioxide separation membrane having an extremely good performance as described above. Therefore, it is possible to preferably use even a membrane having a permeability coefficient ratio $\alpha$ of the carbon dioxide separation membrane of 100 or less, further 50 or less.

The permeation-side pressure for the membrane separation in the carbon dioxide membrane separation step is set at a lower pressure than the feed-side pressure and may be the atmospheric pressure or less. It is preferably selected in the range of from 0.0001 MPa to 0.5 MPa, more preferably from 0.001 to 0.2 MPa.

The operation temperature of membrane separation is set at a temperature suitable for a membrane material to be used.

Carbon dioxide can be recovered as a carbon dioxide-enriched gas in this way. The recovered carbon dioxide-enriched gas may be stored, for example, by being injected into the ground as it is, but it is preferably processed in a $CO_2$ liquefying step to produce liquefied $CO_2$. Therefore, the $CO_2$ concentration of the carbon dioxide-enriched gas is preferably increased so as to facilitate the smooth operation of the $CO_2$ liquefying step, and the concentration is preferably 70% or more, more preferably 80% or more, further preferably 90% or more. When the $CO_2$ concentration is 70% or more, the energy required for the liquefying step can be reduced, and the percentage of the liquefied $CO_2$ to be recovered can be increased.

Note that components other than carbon dioxide contained in the carbon dioxide-enriched gas are, for example, approximately 0.5 to 20% hydrogen, 0.01 to 5% carbon monoxide, and 0.01 to 5% methane.

Further, the carbon dioxide separation membrane off-gas contains, for example, 20 to 70% hydrogen, 5 to 30% carbon dioxide, 3 to 20% carbon monoxide, and 5 to 30% methane.

A method for liquefying $CO_2$, a carbon dioxide liquefier, and the use of the liquefied $CO_2$ and off-gas obtained from the $CO_2$ liquefying step are the same as described in embodiment A.

[Process]

Hereinafter, a suitable process to implement the embodiment B will be described with reference to drawings, but the present invention is not limited thereby.

Figure 4:
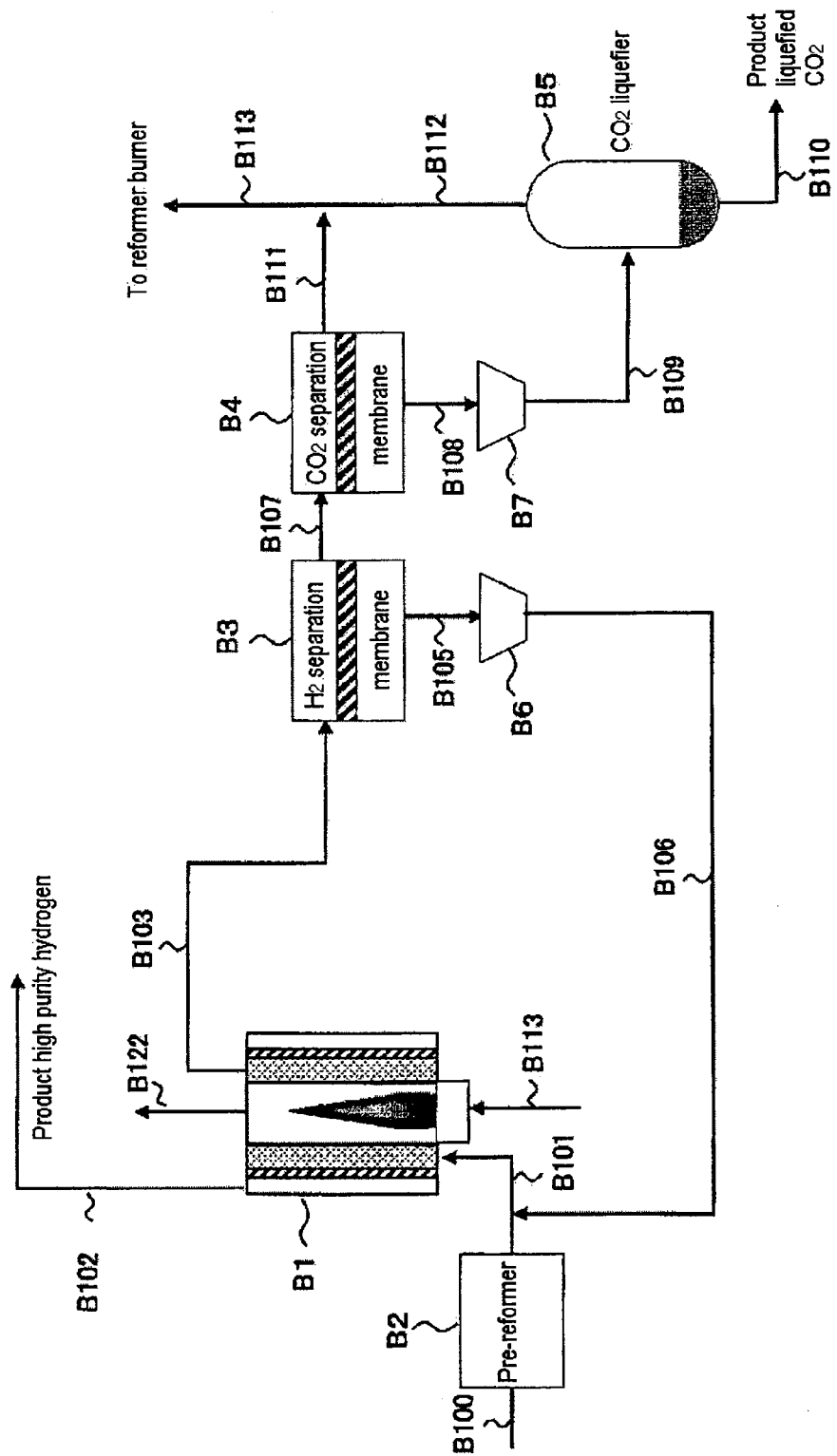
FIG. 4 is a flow diagram for illustrating the outline of an example of an apparatus which can implement the present invention (embodiment B)

FIG. 4 shows an example of a basic configuration of suitable apparatus to implement the present invention. A membrane separation reformer B1 provided in this apparatus is the same as the membrane separation reformer A1 described in embodiment A.

The carbon-containing fuel is fed from a line B100 through a line B101 to the membrane separation reformer B1, particularly, a reforming reaction tube. Particularly when a carbon-containing fuel having a carbon-carbon bond is used, it is possible to install a pre-reformer B2 upstream of introducing the fuel into the membrane separation reformer to reduce the content of a component containing a carbon-carbon bond in the carbon-containing fuel for the purpose of preventing carbon deposition on the hydrogen-permeable membrane and the like.

Steam, oxygen, and the like required for the reforming reaction are also appropriately fed to the reformer (not shown). When the carbon-containing fuel is a liquid or a solid, the carbon-containing fuel can be appropriately evaporated beforehand. If needed, the carbon-containing fuel may be desulfurized in a desulfurizer (not shown) before it is fed to the reformer.

The carbon-containing fuel is decomposed into a gas containing hydrogen by the effect of a reforming catalyst inside the reforming reaction tube $1b$. At this time, a part of hydrogen passes through the hydrogen-permeable membrane $1c$ and flows through the space $1d$ and a line B102 to yield a hydrogen-permeable membrane permeated gas (high purity hydrogen) as product hydrogen.

A gas that does not pass the hydrogen-permeable membrane $1c$ of the reformer B1 (gas having higher concentrations of components other than hydrogen than the high purity hydrogen), that is, reformer off-gas, is introduced into a hydrogen separation membrane B3 through a line B103. The hydrogen-enriched gas is obtained from a line B105 as a gas permeated the hydrogen separation membrane, which is boosted in pressure with a pressure booster B6 and recycled to the upstream of the reformer B1 (line B106). The hydrogen separation membrane off-gas (gas enriched in components other than hydrogen) discharged without permeating the hydrogen separation membrane is fed to a $CO_2$ separation membrane B4 from a line B107. The $CO_2$-enriched gas (gas enriched in carbon dioxide) which permeated the $CO_2$ separation membrane is introduced into a $CO_2$ liquefier B5 through a line B108, a compressor B7, and a line B109. The $CO_2$ separation membrane off-gas (gas enriched in components other than carbon dioxide) not having permeated the $CO_2$ separation membrane is sent to a reformer burner $1e$ from a line B111.

Product liquefied carbon dioxide is recovered from the carbon dioxide liquefier (line B110). Unliquefied gas (line B112) discharged from the carbon dioxide liquefier joins the $CO_2$ separation membrane off-gas (line B111). The resulting mixed gas is fed to the burner $1e$ from a line B113 and burns, and the combustion gas is exhausted from a line B122. The heat of combustion is used to heat the reforming reaction tube.

According to the present embodiment B, high purity hydrogen can first be very efficiently recovered in the membrane separation reforming step. Then, hydrogen is separated from the carbon dioxide-containing gas discharged from the membrane separation reforming step to form a hydrogen separation membrane off-gas in which carbon dioxide concentration is increased, followed by separation of carbon dioxide from the hydrogen separation membrane off-gas. That is, hydrogen is first withdrawn from the reformer off-gas, from which hydrogen is further separated to increase the carbon dioxide concentration, followed by carbon dioxide separation. This allows efficient carbon dioxide separation. Further, the yield of hydrogen may be improved by recycling the separated hydrogen to the membrane separation reformer. The membrane separation reforming step, the hydrogen membrane separation step, and the carbon dioxide membrane separation step can be performed under at approximately the same pressure without boosting pressure between these steps. Therefore, increase of energy consumption can be suppressed.

Embodiment C

Hereinafter, embodiment C which is a further embodiment of the present invention will be described in detail. In the present embodiment, a membrane separation reforming step, a shift reaction step, and a carbon dioxide membrane separation step are performed in this order.

[Shift Reaction Step]

In the shift reaction step, the reformer off-gas is subjected to shift reaction. For this purpose, the reformer off-gas is treated in a shift reactor. In the shift reactor, CO and steam are reacted with each other and they are converted to $CO_2$ and hydrogen. If necessary, additional steam can be fed by providing a steam inlet upstream of the shift reactor.

A known shift reaction catalyst such as an iron-chromium-based catalyst, a copper-zinc-based catalyst, or a noble metal-based catalyst such as a platinum-based catalyst may be used as a catalyst used for the shift reactor. The reaction temperature in the shift reactor is appropriately set generally in the range of from 200° C. to 500° C., and the outlet temperature is preferably set at 300° C. or less in order to reduce the CO concentration at the outlet of the shift reactor as low as possible. Although the reaction pressure is not particularly limited, it is simple and advantageous to perform the reaction at about the pressure in the membrane separation reformer (reforming reaction pressure).

From the shift reaction step, there is obtained a gas (shift reaction step outlet gas) containing, for example, 15 to 60% hydrogen, 0.2 to 3% carbon monoxide, 20 to 70% carbon dioxide, and 1 to 20% methane.

[Carbon Dioxide Separation Step]

In the carbon dioxide separation step, the gas having been subjected to the shift reaction step is separated into a gas enriched in carbon dioxide (carbon dioxide-enriched gas) and a gas enriched in components other than carbon dioxide (carbon dioxide separation off-gas). Carbon dioxide is concentrated in this step.

For this purpose, the shift reaction step outlet gas obtained from the shift reaction step may be separated into the carbon dioxide-enriched gas and the carbon dioxide separation off-gas. Alternatively, the shift reaction step outlet gas may be first subjected to another step such as a hydrogen separation step to be described below and then separated into the carbon dioxide-enriched gas and the carbon dioxide separation off-gas.

As a separation method of carbon dioxide, a known separation method capable of concentrating carbon dioxide may be taken, such as a physical absorption method, a chemical absorption method, a membrane separation method, cryogenic separation method, and a compression liquefying method. The shift reaction step outlet gas can have a relatively high pressure comparable to the reforming-side (the side on which hydrogen does not permeate) pressure in the membrane separation reforming step. Therefore, a carbon dioxide separation method that can effectively use this pressure is preferred. Although a membrane separation method may be most preferably employed in this sense, it is also possible to use other methods. Therefore, each method will be described below.

Physical Absorption Method

A physical absorption method is a method of separating and recovering carbon dioxide from a mixed gas by physical mechanism such as adsorption and dissolution without performing a chemical reaction, and the PSA (Pressure Swing Adsorption) method is particularly preferably employed.

The PSA method is one of the methods of selecting and separating a specific gas from a mixed gas. It is a method including introducing the mixed gas into an adsorption tower packed with an adsorbent with a relatively high pressure and allowing a specific component to adsorb to the adsorbent to thereby separate the mixed gas into an adsorbed gas component and a non-adsorbed gas component; and then reducing the pressure of the adsorption system and if necessary using a purge gas to eliminate the adsorbate (adsorbed gas component) adsorbed to the adsorbent. Industrially, a plurality of towers each packed with an adsorbent are provided. In each adsorption tower, a series of operations including pressure-boost, adsorption, pressure-release, and washing is repeated. Thereby, the entire equipment allows continuous separation and recovery. Carbon dioxide is generally obtained by desorption from the adsorbent in the pressure-release and washing steps.

Chemical Absorption Method

A chemical absorption method may be employed as a method for concentrating carbon dioxide. The chemical absorption method is a method in which carbon dioxide is reacted mainly with a basic substance such as amine or alkali to be absorbed therein by being converted into a form such as hydrogencarbonate. On the other hand, the absorbent solution is heated or depressurized to separate and recover carbon dioxide, thereby regenerating the absorbent solution for circulation.

Membrane Separation Method

A membrane separation method may be employed as a method for concentrating carbon dioxide. The membrane separation method is preferably a method of using a carbon dioxide separation membrane which selectively permeates carbon dioxide. Examples of the membrane used in this case are the same as described in embodiment A.

From the viewpoint of the separation efficiency of carbon dioxide, the carbon dioxide separation membrane has a ratio $\alpha$ of carbon dioxide permeability coefficient to hydrogen permeability coefficient (permeability coefficient ratio) of preferably 5 or more, more preferably 10 or more, further preferably 20 or more. On the other hand, the upper limit of $\alpha$ is not particularly limited since it is generally the higher the better, but it is enough if it is about 1000.

Here, the ratio of $CO_2$ permeability coefficient to hydrogen permeability coefficient $\alpha$ is defined as described above.

The shape of the separation membrane is not particularly limited even if any material is used, but any shape such as a planar, tubular, or hollow fiber shape may be selected.

The permeation-side pressure in the carbon dioxide membrane separation is set at a lower pressure than the feed-side pressure and may be the atmospheric pressure or less. It is preferably selected in the range of from 0.0001 MPa to 0.5 MPa, more preferably from 0.001 to 0.2 MPa.

The operation temperature of the carbon dioxide membrane separation is set at a temperature suitable for a membrane material to be used.

In addition, there may be employed cryogenic separation method in which carbon dioxide is separated by cooling a mixed gas, or a compression liquefying method in which carbon dioxide is liquefied by compression to be separated from other components, or the like. Of course, it is also possible to use the plurality of procedures as described above in combination as a method for concentrating carbon dioxide.

Carbon dioxide can be recovered as a carbon dioxide-enriched gas in this way. The recovered carbon dioxide-enriched gas may be stored, for example, by being injected into the ground as it is, but it is preferably processed in a $CO_2$ liquefying step to produce liquefied $CO_2$. Therefore, the $CO_2$ concentration of the carbon dioxide-enriched gas is preferably increased so as to facilitate the smooth operation of the $CO_2$ liquefying step, and the concentration is preferably 70% or more, more preferably 80% or more, further preferably 90% or more. When the $CO_2$ concentration is 70% or more, the energy required for the liquefying step can be reduced, and the percentage of the liquefied $CO_2$ to be recovered can be increased.

Note that components other than carbon dioxide contained in the carbon dioxide-enriched gas are, for example, 0.5 to 20% hydrogen, 0.01 to 5% carbon monoxide, and 0.01 to 5% methane.

Further, the carbon dioxide separation membrane off-gas contains, for example, 20 to 70% hydrogen, 5 to 30% carbon dioxide, 1 to 20% carbon monoxide, and 5 to 30% methane.

A method for liquefying $CO_2$, a carbon dioxide liquefier, and the use of the liquefied $CO_2$ and off-gas obtained from the $CO_2$ liquefying step are the same as described in embodiment A.

[Hydrogen Separation Step]

A hydrogen separation step using a separation membrane with hydrogen selectivity (hydrogen separation membrane) may be performed besides the carbon dioxide separation step. The hydrogen separation step (1) may be performed before the carbon dioxide separation step to treat the shift reaction step outlet gas (to separate hydrogen) or (2) may be performed after the carbon dioxide separation step to treat (to separate hydrogen) the carbon dioxide separation off-gas. The hydrogen separation step separates a gas to be treated into a gas enriched in hydrogen (hydrogen-enriched gas) and a gas enriched in components other than hydrogen (hydrogen separation off-gas).

Here, in the case of the above (1), the carbon dioxide separation step will treat the hydrogen separation off-gas. Since the hydrogen separation off-gas is a gas not having permeated the hydrogen separation membrane, the pressure of the hydrogen separation-step off-gas can be substantially prevented from being reduced relative to the hydrogen separation-step inlet-side pressure. Therefore, even when performing the carbon dioxide separation step after performing the hydrogen separation step, it is not necessary to pressure-boost the off-gas again in order to perform the carbon dioxide separation step. Note that the hydrogen separation-step inlet-side pressure can be substantially prevented from being reduced relative to the pressure of the shift reaction.

On the other hand, in the case of the above (2), the carbon dioxide separation off-gas can maintain a relatively high pressure. For example, when performing the carbon dioxide separation step using a membrane which selectively permeates carbon dioxide, the pressure of the carbon dioxide separation off-gas can be substantially prevented from being reduced relative to the carbon dioxide separation step inlet-side pressure. Therefore, also in the case of the above (2), it is not necessary to install a pressure booster between these steps. Note that the carbon dioxide separation step inlet-side pressure can be substantially prevented from being reduced relative to the pressure of the shift reaction.

Thus, in each case, the hydrogen separation step can be performed without complicating the process. After reforming, the shift reaction, the carbon dioxide separation, and the hydrogen separation can be performed without boosting pressure again and without consuming additional energy.

As the hydrogen separation membrane used in the hydrogen membrane separation step, a known membrane capable of selectively permeating hydrogen may be appropriately selected and employed. Examples thereof are the same as those described for embodiment A.

The hydrogen separation membrane has a ratio α of $CO_2$ permeability coefficient to hydrogen permeability coefficient of preferably from 0 to 0.5, more preferably from 0 to 0.3, further preferably from 0 to 0.15. The ratio α of the hydrogen separation membrane is the smaller the better, but it is substantially enough if it is about 0.001.

The shape of the separation membrane is not particularly limited even if any material is used, and any shape such as a planar, tubular, or hollow fiber shape may be selected.

The permeation-side pressure in the hydrogen membrane separation step is set at a lower pressure than the feed-side pressure and may be the atmospheric pressure or less. It is preferably selected in the range of from 0.0001 MPa to 0.5 MPa, more preferably from 0.001 to 0.1 MPa.

The operation temperature of the hydrogen membrane separation is set at a temperature suitable for a membrane material to be used. For example, the suitable temperature is in the range of from 250 to 500° C. for a palladium membrane, and it is in the range of from room temperature to 150° C. for a polyimide membrane.

The hydrogen-enriched gas obtained in the hydrogen separation step contains, for example, when a polymer membrane such as a polyimide membrane is used, 50 to 95% hydrogen, 3 to 40% carbon dioxide, 0 to 10% carbon monoxide, and 0 to 10% methane in the case of the above (1), or contains 70 to 99% hydrogen, 1 to 20% carbon dioxide, 0 to 5% carbon monoxide, and 0 to 5% methane in the case of the above (2).

On the other hand, the hydrogen separation membrane off-gas contains, for example, 5 to 50% hydrogen, 30 to 70% carbon dioxide, 1 to 30% carbon monoxide, and 1 to 30% methane in the case of the above (1), or contains 1 to 50% hydrogen, 30 to 60% carbon dioxide, 1 to 20% carbon monoxide, and 1 to 30% methane in the case of the above (2).

In the case of (1), the hydrogen separation off-gas is treated in the carbon dioxide separation step as described above. In the case of (2), the hydrogen separation off-gas may be fed to a combustion means such as a burner mounted on the reformer used in the separation reforming step for use as a fuel. Since the hydrogen-enriched gas obtained in the hydrogen separation step has relatively high hydrogen concentration, it may be recycled upstream of the reformer in order to recover hydrogen.

[Process]

Hereinafter, a suitable process to implement the embodiment C will be described with reference to drawings, but the present invention is not limited thereby.

First Process Example

Figure 6:
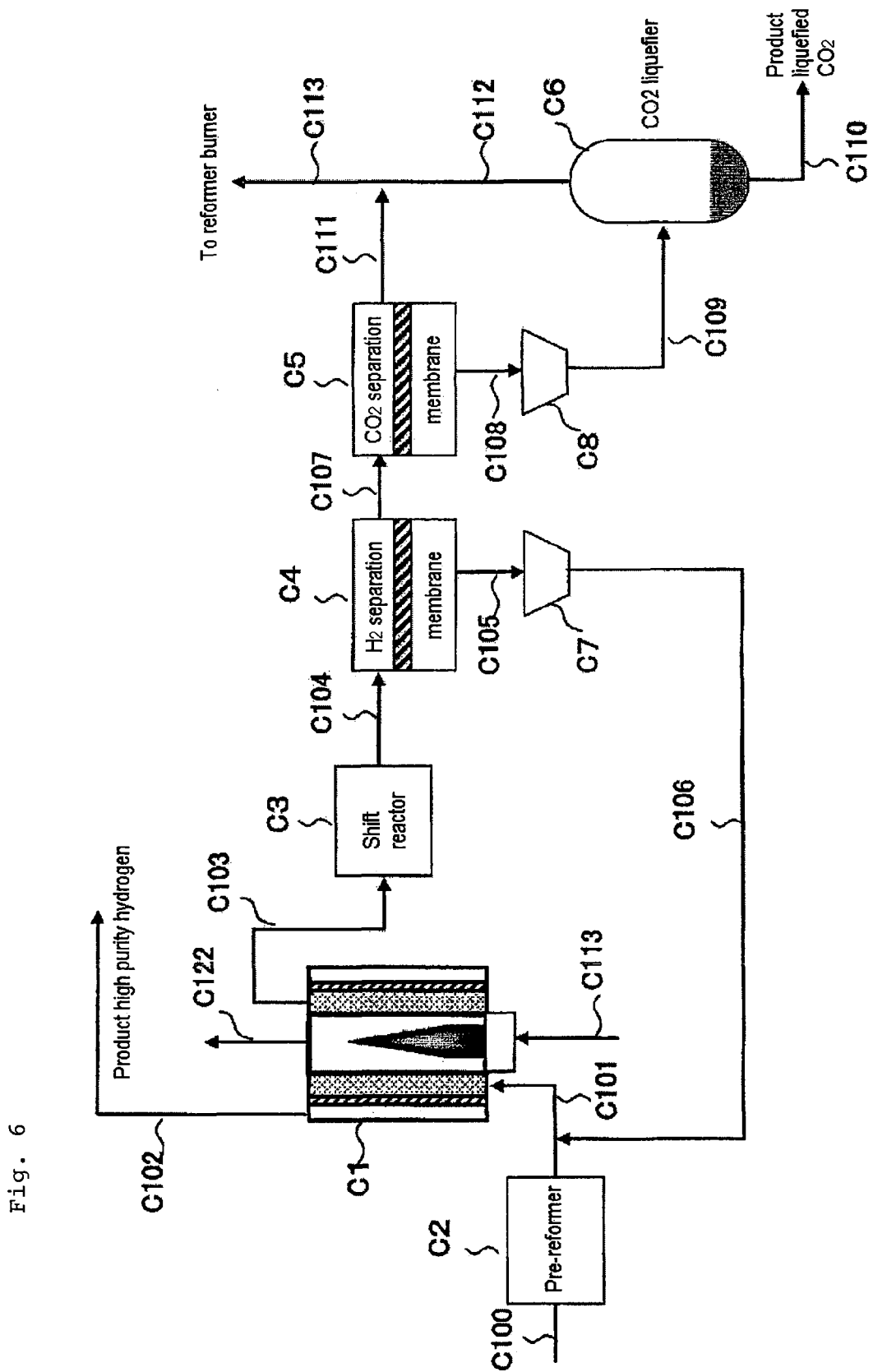
FIG. 6 is a flow diagram for illustrating the outline of an example of an apparatus which can implement the present invention (embodiment C)

FIG. 6 shows an example of a basic configuration of suitable apparatus to implement the embodiment C. The membrane separation reformer C1 provided in this apparatus is the same as the one described in embodiment A.

A carbon-containing fuel is fed from a line C100 through a line C101 to a reformer C1, particularly, to a reforming reaction tube. Particularly when a carbon-containing fuel having a carbon-carbon bond is used, it is possible to install a pre-reformer C2 upstream of introducing the fuel into the membrane separation reformer to reduce the content of a component containing a carbon-carbon bond in the carbon-containing fuel for the purpose of preventing carbon deposition on the hydrogen-permeable membrane and the like.

Steam, oxygen, and the like required for the reforming reaction are appropriately fed to the reformer (not shown). When the carbon-containing fuel is a liquid or a solid, the carbon-containing fuel may be appropriately evaporated beforehand. If needed, the carbon-containing fuel may be desulfurized in a desulfurizer (not shown) before it is fed to the reformer.

The carbon-containing fuel is decomposed into a hydrogen-containing gas by the effect of a reforming catalyst inside the reforming reaction tube 1b. At this time, a part of hydrogen passes through the hydrogen-permeable membrane 1c and flows through the space 1d and a line C102 to yield a hydrogen-permeable membrane permeated gas (high purity hydrogen) as product hydrogen.

A gas that does not pass the hydrogen-permeable membrane 1c of the reformer C1 (gas having higher concentrations of components other than hydrogen than the high purity hydrogen), that is, reformer off-gas, is introduced into a hydrogen separation membrane C4 through a line C103, a shift reactor C3, and a line C104. The hydrogen-enriched gas (line C105) is obtained as a gas permeated the hydrogen separation membrane, which is boosted in pressure with a pressure booster C7 and recycled upstream of the reformer C1 (line C106). The hydrogen separation off-gas (gas enriched in components other than hydrogen) discharged without permeating the hydrogen separation membrane is fed to a $CO_2$ separation membrane C5 from a line C107. The $CO_2$-enriched gas (gas enriched in carbon dioxide) which permeated the $CO_2$ separation membrane is introduced into a $CO_2$ liquefier C6 through a line C108, a compressor C8, and a line C109. A $CO_2$ separation off-gas (gas enriched in components other than carbon dioxide) not having permeated $CO_2$ separation membrane is sent to a reformer burner 1e from a line C111.

Product liquefied carbon dioxide is recovered from the carbon dioxide liquefier (line C110). Unliquefied gas (line C112) discharged from the carbon dioxide liquefier joins the $CO_2$ separation membrane off-gas (line C111). The resulting mixed gas is fed to a burner 1e from a line C113 and burns, and the combustion gas is exhausted from a line C122. The heat of combustion is used to heat the reforming reaction tube.

Second Process Example

Figure 7:
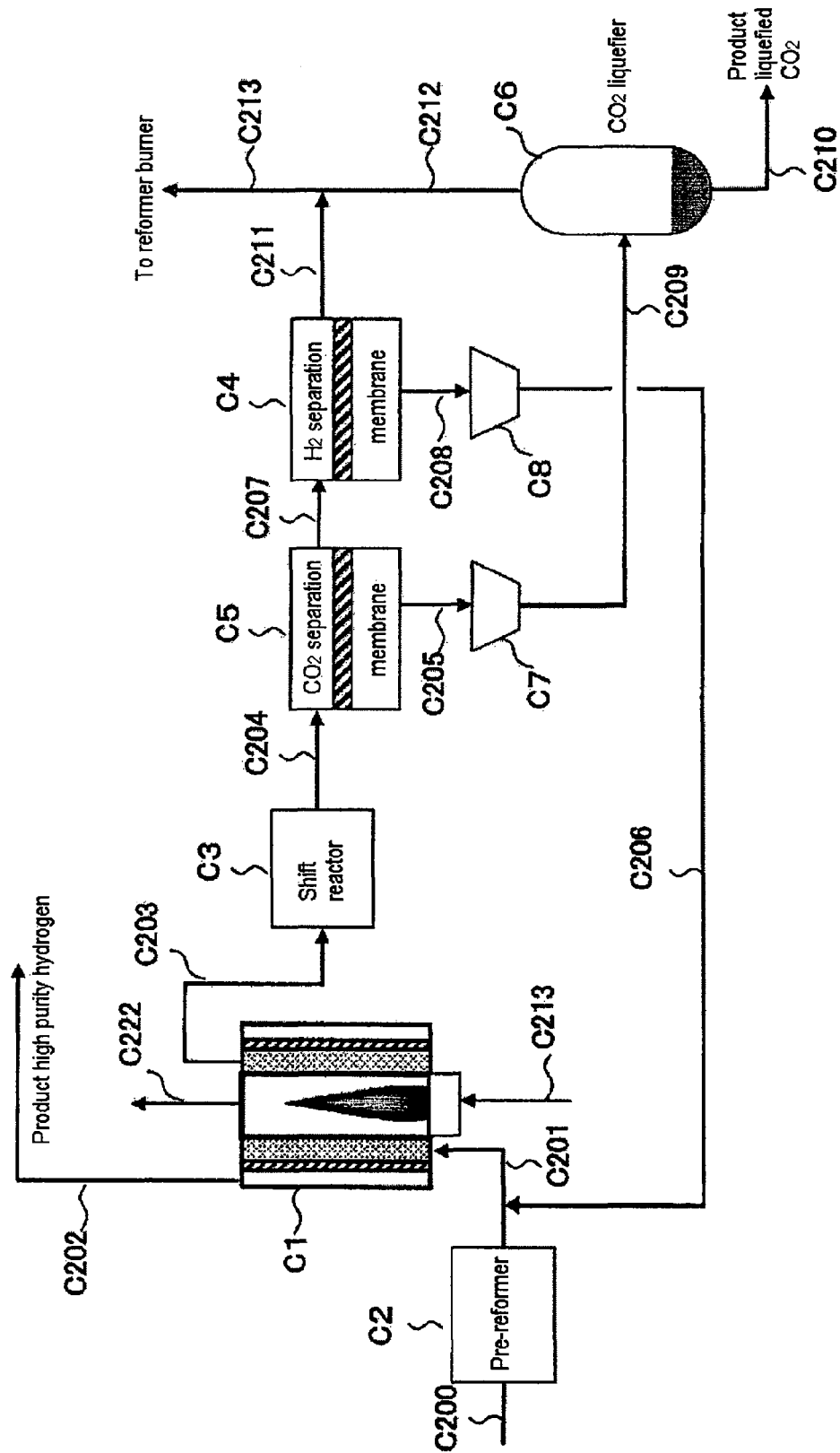
FIG. 7 is a flow diagram for illustrating the outline of another example of an apparatus which can implement the present invention (embodiment C).

FIG. 7 shows another example of a basic configuration of suitable apparatus to implement the embodiment C. In this example, the shift reaction step outlet gas obtained from the shift reactor is first subjected to a carbon dioxide separation step and then subjected to a hydrogen separation step.

The membrane separation reformer is the same as that of the above-described process and has a structure shown in FIG. 3.

A carbon-containing fuel is fed from a line C200 through a line C201 to a reformer C1, particularly, to a reforming reaction tube. Particularly when a carbon-containing fuel having a carbon-carbon bond is used, it is possible to install a pre-reformer C2 upstream of introducing the fuel into the membrane separation reformer to reduce the content of a component containing a carbon-carbon bond in the carbon-containing fuel for the purpose of preventing carbon deposition on the hydrogen-permeable membrane and the like.

Steam, oxygen, and the like required for the reforming reaction are appropriately fed to the reformer (not shown). When the carbon-containing fuel is a liquid or a solid, the carbon-containing fuel may be appropriately evaporated beforehand. If needed, the carbon-containing fuel may be desulfurized in a desulfurizer (not shown) before it is fed to the reformer.

The carbon-containing fuel is decomposed into a gas containing hydrogen by the effect of a reforming catalyst inside the reforming reaction tube 1b. At this time, a part of hydrogen passes through the hydrogen-permeable membrane 1c and flows through the space 1d and a line C202 to yield a hydrogen-permeable membrane permeated gas (high purity hydrogen) as product hydrogen.

A gas that does not pass the hydrogen-permeable membrane 1c of the reformer C1 (gas having higher concentrations of components other than hydrogen than the high purity hydrogen), that is, reformer off-gas, is fed to a $CO_2$ separation membrane C5 through a line C203, a shift reactor C3, and a line C204. The $CO_2$-enriched gas (gas enriched in carbon dioxide) which permeated the $CO_2$ separation membrane is introduced into a $CO_2$ liquefier C6 through a line C205 and a compressor C7 (line C209).

Product liquefied carbon dioxide is recovered from the carbon dioxide liquefier (line C210). Unliquefied gas (line C212) discharged from the carbon dioxide liquefier joins the hydrogen separation off-gas (line C211). The resulting mixed gas is fed to a burner 1e from a line C213 and burns, and the combustion gas is exhausted from a line C222. The heat of combustion is used to heat the reforming reaction tube.

The $CO_2$ separation off-gas (gas enriched in components other than carbon dioxide) not having permeated the $CO_2$ separation membrane is introduced into a hydrogen separation membrane C4 from a line C207. A hydrogen-enriched gas (line C208) is obtained as a gas permeated the hydrogen separation membrane, which is boosted in pressure with a pressure booster C8 and recycled upstream of the reformer C1 (line C206). The hydrogen separation off-gas (gas enriched in components other than hydrogen) discharged without permeating the hydrogen separation membrane joins a $CO_2$ liquefier off-gas (line C212) through a line C211. The resulting mixed gas is sent to the reformer burner 1e from a line C213 and used as a fuel therefor.

According to the present embodiment C, high purity hydrogen can first be very efficiently withdrawn in the membrane separation reforming step. Then, the gas containing carbon dioxide discharged from the membrane separation reforming step is subjected to shift reaction to increase the concentration of carbon dioxide. Carbon dioxide is then separated. That is, hydrogen is first withdrawn from the reformed gas; further, the carbon dioxide concentration is increased; and then carbon dioxide is separated. This allows efficient carbon dioxide separation. Further, the yield of hydrogen can be improved by combining the hydrogen membrane separation. The membrane separation reforming step and the carbon dioxide membrane separation step, and further the hydrogen membrane separation step can be performed by a comparable pressure without boosting pressure between these steps. Therefore, increase of energy consumption can be suppressed.

According to the present invention, energy consumption can be suppressed when producing both high purity hydrogen and carbon dioxide in a form suitable for storage using a carbon-containing fuel such as fossil fuels as a raw material. Also, the yield of hydrogen can be improved. Moreover, the hydrogen production and carbon dioxide recovery can also be performed using relatively simple apparatus, which allows the increase of system cost to be suppressed. Therefore, the present invention contributes to implementation of hydrogen society and prevention of global warming.

EXAMPLES

Example A1

The heat and mass balance was determined for the process with the configuration shown in FIG. 1. This process includes a membrane separation reformer having the configuration as shown in FIG. 3.

The pre-reformer A2, which is packed with a Ru-based catalyst and performs a steam reforming reaction at an outlet temperature of 550° C. and pressure of 1 MPa, is fed with 215 kg/h of naphtha (line 100) and 946 kg/h of steam (not shown). A partially reformed gas obtained from the pre-reformer joins a recycle gas fed from the recycle line A106 and is then introduced into the reforming reaction tube 1b of the membrane separation reformer A1. A nickel-based steam reforming catalyst is packed in a reforming reaction tube whose outlet temperature is set at 600° C. decomposes the carbon-containing fuel to produce hydrogen. At the same time, a part of the produced hydrogen permeates the hydrogen-permeable membrane 1c constituting a part of the wall of the reforming reaction tube and consisting of a Pd-based alloy and flows through the space (hydrogen channel) 1d to yield 34.5 kmol/h of high purity hydrogen having a purity of 99.99% (line A102).

As the off-gas of the membrane separation reformer (line A103), there is obtained a mixed gas having a total gas flow rate excluding steam of 23.6 kmol/h, a $CO_2$ concentration of 50%, and a hydrogen concentration of 35%. The mixed gas is dewatered with a dewaterer (not shown) and then introduced into the $CO_2$ separation membrane A3 including a membrane having a $CO_2$/hydrogen permeability coefficient ratio α of 30. The permeation side gas (line A105) of the $CO_2$ separation membrane has a $CO_2$ concentration of 98%, which is pressurized to about 8 MPa by the compressor A6 and then fed into the $CO_2$ liquefier A5 from the line A109 to yield 8.7 kmol/h of a liquefied-$CO_2$ flow (line A110). The non-permeation side gas (line A107) of the $CO_2$ separation membrane is introduced, at a pressure as it is, into the hydrogen separation membrane A4 provided with a polyimide membrane having a $CO_2$/hydrogen permeability coefficient ratio α of 0.11. On the permeation side of the hydrogen separation membrane, there is obtained 4.7 kmol/h of a gas (line A108) having a hydrogen concentration of 94% and a pressure of 0.1 MPa, which is recycled upstream of the membrane separation reformer A1 through the compressor A7 and the line A106. On the other hand, the non-permeation side gas (line A111) of the hydrogen separation membrane and the off-gas of the $CO_2$ liquefier (line A112) are combined to form a gas flow (line A113), which is sent to the reformer burner 1e, used as a fuel for combustion in the reformer, and then discharged (line A122).

The energy consumed by the compressors in this process is 7.8 kW/kmol-recovered $CO_2$, and the carbon dioxide recovery rate as a liquefied $CO_2$ based on the amount of $CO_2$ contained in the membrane separation reformer outlet gas (line A103) is 70%.

The permeability coefficient ratio α of the carbon dioxide separation membrane, the amount of high purity hydrogen recovered, the amount of carbon dioxide recovered, and the energy consumption (sum total) of the compressors per 1 kmol of the recovered liquefied carbon dioxide are shown in Table A1. The heat and mass balance is shown in Table A3.

Examples A2 to A4

The heat and mass balance was determined in the same manner as in Example A1 except that the permeability coefficient ratio α of the membrane used for the $CO_2$ separation membrane device A3 was varied, respectively, as shown in Table A1. The permeability coefficient ratio α of the carbon dioxide separation membrane, the amount of high purity hydrogen recovered, the amount of carbon dioxide recovered, and the energy consumption (sum total) of the compressors are shown in Table A1.

TABLE A1

| Examples | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| A1 | 30 | 34.5 | 8.7 | 7.8 |
| A2 | 5 | 34.5 | 6.7 | 10.5 |
| A3 | 10 | 34.5 | 7.7 | 8.9 |
| A4 | 100 | 34.5 | 9.0 | 8.3 |

Examples A5 to A8

The permeated gas of the hydrogen separation membrane (line A108) was taken out for effective use instead of being recycled upstream of the membrane separation reformer A1. That is, the pressure booster A7 and the line A106 were not provided, but the hydrogen-enriched gas (line A108) was taken out.

The heat and mass balance was determined in the same manner as in Example A1 except for the above. At this time, the permeability coefficient ratio α of the $CO_2$ separation membrane was varied, respectively, as shown in Table A2 to give Examples A5 to A8. The results are shown in Table A2.

The gas each having a composition of the hydrogen-enriched gas obtained in Examples A5 to A8 was bubbled into a solution of dimethyl itaconate including a Pt/C catalyst (catalyst in which platinum is supported on carbon particles) and methanol. As a result, production of dimethyl methylsuccinate was identified, which showed that the hydrogen-enriched gas can be used for hydrogenation of olefin.

TABLE A2

| Example | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| A5 | 5 | 34 | 7.2 | 8.8 |
| A6 | 10 | 34 | 8.1 | 6.4 |
| A7 | 30 | 34 | 9.0 | 4.9 |
| A8 | 100 | 34 | 9.1 | 4.5 |

TABLE A3

Heat and mass balance results in Example A1

| | | A102 Product hydrogen | A103 Reformer off-gas | A105 $CO_2$ separation membrane permeated gas | A109 $CO_2$ liquefier inlet | A107 $CO_2$ separation membrane off-gas | A108 $H_2$ separation membrane permeated gas | A106 Recycle gas | A111 $H_2$ separation membrane off-gas |
|---|---|---|---|---|---|---|---|---|---|
| Pressure | Mpa | 0.1 | 1 | 0.1 | 8.3 | 1 | 0.1 | 1 | 1 |
| Total flow rate | kmol/h | 34.5 | 23.6 | 9.2 | ← | 14.4 | 4.7 | ← | 9.7 |
| CO2 | mol % | 0% | 50.1% | 97.8% | ← | 19.5% | 6.1% | ← | 26.1% |
| CO | mol % | 0% | 5.7% | 0.1% | ← | 9.2% | 0.2% | ← | 13.7% |
| H2 | mol % | 100% | 35.4% | 1.8% | ← | 56.8% | 93.5% | ← | 38.8% |
| CH4 | mol % | 0% | 8.9% | 0.2% | ← | 14.4% | 0.2% | ← | 21.4% |

Comparative Example A1

The membrane separation reformer off-gas (line A103) was directly compressed and liquefied in the $CO_2$ liquefier A5 without using the hydrogen separation membrane and the $CO_2$ separation membrane. Therefore, no recycle line A106 is provided.

The heat and mass balance was determined in the same manner as in Example A1 except for the above. As a result, the energy consumed by the compressors was 37 kW/kmol-$CO_2$, and the $CO_2$ recovery rate as a liquefied $CO_2$ was only 37%.

Comparative Example A2

The membrane separation reformer off-gas (line A103) was fed to the hydrogen separation membrane A4 without using the $CO_2$ separation membrane. The non-permeation side gas (line A111) of the hydrogen separation membrane was directly compressed and liquefied in the $CO_2$ liquefier A5

(the hydrogen separation membrane permeated gas (line A108) which is a hydrogen-enriched gas is boosted in pressure and recycled to the membrane separation reformer as in Example A1).

The heat and mass balance was determined in the same manner as in Example A1 except for the above. As a result, the energy consumed by the compressors was 28 kW/kmol-$CO_2$, and the $CO_2$ recovery rate as a liquefied $CO_2$ was only 43%.

Example B1

The heat and mass balance was determined for the process with the configuration shown in FIG. 4. This process includes a membrane separation reformer having the configuration as shown in FIG. 3.

The pre-reformer B2, which is packed with a Ru-based catalyst and performs a steam reforming reaction at an outlet temperature of 550° C. and pressure of 1 MPa, is fed with 215 kg/h of naphtha (line 100) and 946 kg/h of steam (not shown). A partially reformed gas obtained from the pre-reformer joins a recycle gas fed from the recycle line B106 and is then introduced into the reforming reaction tube 1b of the membrane separation reformer B1. A nickel-based steam reforming catalyst, which is packed in the reforming reaction tube whose outlet temperature is set at 600° C., decomposes the carbon-containing fuel to produce hydrogen. A part of the produced hydrogen permeates the hydrogen-permeable membrane 1c constituting a part of the wall of the reforming reaction tube and consisting of a Pd-based alloy and flows through the space 1d to yield 34.4 kmol/h of high purity hydrogen having a purity of 99.99% (line B102).

As the off-gas of the membrane separation reformer (line B103), there is obtained a mixed gas having a total gas flow rate excluding steam of 23.6 kmol/h, a $CO_2$ concentration of 52%, and a hydrogen concentration of 34%. The mixed gas is dewatered with a dewaterer (not shown) and then introduced into the hydrogen separation membrane B3 provided with a polyimide membrane having a $CO_2$/hydrogen permeability coefficient ratio $\alpha$ of 0.11. On the permeation side of the hydrogen separation membrane, there is obtained 3.2 kmol/h of a gas (line B105) having a hydrogen concentration of 78% and a pressure of 0.1 MPa, which is recycled upstream of the membrane separation reformer B1 through the compressor B6 and the line B106.

On the other hand, the non-permeation side gas (line B107) of the hydrogen separation membrane is introduced, at a pressure as it is, into the $CO_2$ separation membrane B4 equipped with a membrane having a $CO_2$/hydrogen permeability coefficient ratio $\alpha$ of 30. The permeation side gas (line B108) of the $CO_2$ separation membrane has a $CO_2$ concentration of 95%, which is pressurized to about 8 MPa by the compressor B7 and then fed into the $CO_2$ liquefier B5 (line B109) to yield 9.1 kmol/h of a liquefied $CO_2$ flow (line B110). The non-permeation side gas (line B111) of the $CO_2$ separation membrane and the off-gas of the $CO_2$ liquefier (line B112) are combined to form a gas flow (line B113), which is sent to the reformer burner 1e, used as a fuel for combustion in the reformer, and then discharged (line B122).

The energy consumed by the compressors in this process is 5.6 kW/kmol-recovered $CO_2$, and the carbon dioxide recovery rate as a liquefied $CO_2$ based on the amount of $CO_2$ contained in the membrane separation reformer outlet gas (line B103) is 74%.

The permeability coefficient ratio $\alpha$ of the carbon dioxide separation membrane, the amount of high purity hydrogen recovered, the amount of carbon dioxide recovered, and the energy consumption (sum total) of the compressors per 1 kmol of the recovered liquefied carbon dioxide are shown in Table B1. The heat and mass balance is shown in Table B4.

Examples B2 to B4

The heat and mass balance was determined in the same manner as in Example B1 except that the permeability coefficient ratio $\alpha$ of the membrane used for the $CO_2$ separation membrane device B4 was varied, respectively, as shown in Table B1. The permeability coefficient ratio $\alpha$ of the carbon dioxide separation membrane, the amount of high purity hydrogen recovered, the amount of carbon dioxide recovered, and the energy consumption (sum total) of the compressors are shown in Table B1.

TABLE B1

| Examples | $\alpha$ of $CO_2$ separation membrane | Recovered high purity hydrogen, kmol/h | Recovered liquefied $CO_2$, kmol/h | Energy consumed by compressor, kW/kmol-$CO_2$ |
| --- | --- | --- | --- | --- |
| B1 | 30 | 34.4 | 9.1 | 5.6 |
| B2 | 5 | 34.4 | 7.3 | 9.6 |
| B3 | 10 | 34.4 | 9.2 | 5.9 |
| B4 | 100 | 34.4 | 9.3 | 5.2 |

Examples B5 to B8

The permeated gas of the hydrogen separation membrane (line B105) was used as a fuel for the burner 1e instead of being recycled upstream of the membrane separation reformer B1. That is, the booster B6 and the line B106 were not provided, but the line B105 was joined to the line B113.

The heat and mass balance was determined in the same manner as in Example B1 except for the above. At this time, the permeability coefficient ratio $\alpha$ of the $CO_2$ separation membrane was varied, respectively, as shown in Table B2 to give Examples B5 to B8. The results are shown in Table B2.

TABLE B2

| Examples | $\alpha$ of $CO_2$ separation membrane | Recovered high purity hydrogen, kmol/h | Recovered liquefied $CO_2$, kmol/h | Energy consumed by compressor, kW/kmol-$CO_2$ |
| --- | --- | --- | --- | --- |
| B5 | 5 | 34.0 | 7.7 | 8.2 |
| B6 | 10 | 34.0 | 8.6 | 6.1 |
| B7 | 30 | 34.0 | 9.4 | 4.8 |
| B8 | 100 | 34.0 | 9.5 | 4.5 |

Comparative Example B1

The membrane separation reformer off-gas (line B103) was directly compressed and liquefied in the $CO_2$ liquefier B5 without using the hydrogen separation membrane and the $CO_2$ separation membrane. Therefore, no recycle line B106 is provided.

The heat and mass balance was determined in the same manner as in Example B1 except for the above. As a result, the energy consumed by the compressors was 37 kW/kmol-$CO_2$, and the $CO_2$ recovery rate as a liquefied $CO_2$ was only 37%. Note that the present example is the same as Comparative Example A1.

Comparative Example B2

The membrane separation reformer off-gas (line B103) was fed to the hydrogen separation membrane B3 without using the CO₂ separation membrane. The non-permeation side gas (line B107) of the hydrogen separation membrane was directly compressed and liquefied in the CO₂ liquefier B5 (the hydrogen separation membrane permeated gas (line B105) which is a hydrogen-enriched gas is boosted in pressure and recycled to the membrane separation reformer as in Example B1).

The heat and mass balance was determined in the same manner as in Example B1 except for the above. As a result, the energy consumed by the compressors was 28 kW/kmol-CO₂, and the CO₂ recovery rate as a liquefied CO₂ was only 43%. Note that the present example is the same as Comparative Example A2.

Comparative Examples B3 to B6

Figure 5:
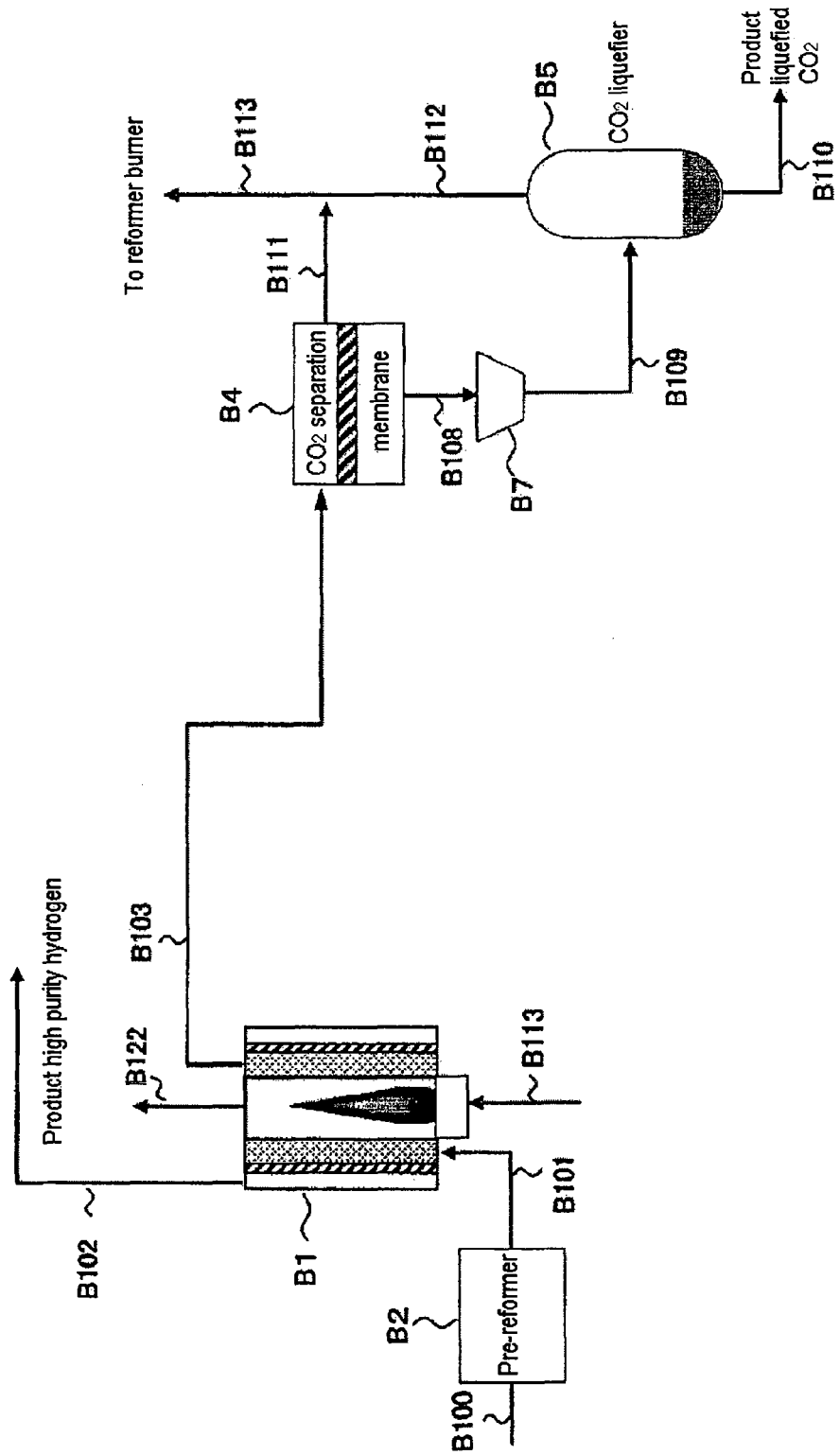
FIG. 5 is a flow diagram for illustrating the apparatus employed in Comparative Examples B3 to B6.

In Example B1, the membrane separation reformer off-gas was first introduced into the hydrogen separation membrane, and subsequently the hydrogen separation membrane off-gas was introduced into the CO₂ separation membrane. Here, as shown in FIG. 5, the membrane separation reformer off-gas was directly introduced into the CO₂ separation membrane without using the hydrogen separation membrane.

The heat and mass balance was determined in the same manner as in Example B1 except for the above. At this time, the permeability coefficient ratio α of the CO₂ separation membrane was varied as shown in Table B3 to give Comparative Examples B3 to B6, respectively. The results are shown in Table B3.

It is understood that both the amount of recovered CO₂ and the power per unit amount of recovered CO₂ are poorer in Comparative Examples B3 to B6 than in Examples B1 to B4.

TABLE B3

| Comparative Examples | α of CO₂ separation membrane | Recovered high purity hydrogen, kmol/h | Recovered liquefied CO₂, kmol/h | Energy consumed by compressor, kW/kmol-CO₂ |
|---|---|---|---|---|
| B3 | 5 | 34.0 | 7.2 | 10.1 |
| B4 | 10 | 34.0 | 8.1 | 6.4 |
| B5 | 30 | 34.0 | 9.0 | 6.1 |
| B6 | 100 | 34.0 | 9.1 | 5.5 |

Example C1

The heat and mass balance was determined for a process with the configuration shown in FIG. 6. This process includes a membrane separation reformer having the configuration as shown in FIG. 3.

The pre-reformer C2, which is packed with a Ru-based catalyst and performs a steam reforming reaction at an outlet temperature of 550° C. and pressure of 1 MPa, is fed with 215 kg/h of naphtha (line 100) and 946 kg/h of steam (not shown). A partially reformed gas obtained from the pre-reformer joins a recycle gas fed from the recycle line C106 and is then introduced into the reforming reaction tube 1b of the membrane separation reformer C1. A nickel-based steam reforming catalyst, which is packed in the reforming reaction tube whose outlet temperature is set at 600° C., decomposes the carbon-containing fuel to produce hydrogen. At the same time, a part of the produced hydrogen permeates the hydrogen-permeable membrane 1c constituting a part of the wall of the reforming reaction tube and consisting of a Pd-based alloy and flows through the space 1d to yield 34.7 kmol/h of high purity hydrogen having a purity of 99.99% (line C102).

As the off-gas of the membrane separation reformer (line C103), there is obtained a mixed gas having a total gas flow rate excluding steam of 23.9 kmol/h, a CO₂ concentration of 51%, a CO concentration of 5.8%, and a hydrogen concentration of 34%. This mixed gas further passes through the shift reactor C3 packed with a Cu—Zn-based catalyst and operated at an outlet temperature of 300° C. and is thereby converted into a mixed gas having a CO₂ concentration of 54%, a CO concentration of 0.9%, and a hydrogen concentration of 37% (line C104). The resulting mixed gas is dewatered with a dewaterer (not shown) and then introduced into the hydrogen separation membrane C4 provided with a polyimide membrane having a CO₂/hydrogen permeability coefficient ratio α of 0.11. On the permeation side of the hydrogen separation membrane, there is obtained 3.7 kmol/h of a gas (line C105) having a hydrogen concentration of 80% and a pressure of 0.1 MPa, which is recycled upstream of the membrane separation reformer C1 through the compressor C7 and the line C106.

On the other hand, the non-permeation side gas (line C107) of the hydrogen separation membrane is introduced, at a pressure as it is, into the CO₂ separation membrane C5 including a membrane having a CO₂/hydrogen permeability coefficient ratio α of 30. The permeation side gas (line C108) of

TABLE B4

Heat and mass balance results in Example B1

| | | B102 Product hydrogen | B103 Reformer off-gas | B105 H₂ separation membrane permeated gas | B106 Recycle gas | B107 H₂ separation membrane off-gas | B111 CO₂ separation membrane off-gas | B108 CO₂ separation membrane permeated gas | B109 CO₂ liquefier inlet |
|---|---|---|---|---|---|---|---|---|---|
| Pressure | Mpa | 0.1 | 1 | 0.1 | 1 | 1 | 1 | 0.1 | 8.0 |
| Total flow rate | kmol/h | 34.4 | 23.6 | 3.2 | ← | 20.5 | 10.5 | 9.9 | ← |
| CO2 | mol % | 0% | 52.3% | 21.3% | ← | 57.1% | 21.6% | 94.8% | ← |
| CO | mol % | 0% | 5.8% | 0.1% | ← | 6.6% | 12.4% | 0.5% | ← |
| H2 | mol % | 100% | 33.8% | 78.4% | ← | 26.9% | 48.5% | 4.0% | ← |
| CH4 | mol % | 0% | 8.1% | 0.2% | ← | 9.3% | 17.5% | 0.7% | ← | the $CO_2$ separation membrane has a $CO_2$ concentration of 95%, which is pressurized to about 8 MPa by the compressor C8 and then fed into the $CO_2$ liquefier C6 from the line C109 to yield 9.0 kmol/h of a liquefied $CO_2$ flow (line C110). The non-permeation side gas (line C111) of the $CO_2$ separation membrane and the off-gas of the $CO_2$ liquefier (line C112) are combined to form a gas flow (line C113), which is sent to the reformer burner 1e, used as a fuel for combustion in the reformer, and then discharged (line C122).

The energy consumed by the compressors in this process is 5.7 kW/kmol-recovered $CO_2$, and the carbon dioxide recovery rate as liquefied $CO_2$ based on the amount of $CO_2$ contained in the membrane separation reformer outlet gas (line C103) is 74%.

The permeability coefficient ratio α of the carbon dioxide separation membrane, the amount of high purity hydrogen recovered, the amount of carbon dioxide recovered, and the energy consumption (sum total) of the compressors per 1 kmol of the recovered liquefied carbon dioxide are shown in Table C1. The heat and mass balance is shown in Table C5.

Examples C2 to C4

The heat and mass balance was determined in the same manner as in Example C1 except that the permeability coefficient ratio α of the membrane used for the $CO_2$ separation membrane device C5 was varied, respectively, as shown in Table C1. The permeability coefficient ratio α of the carbon dioxide separation membrane, the amount of high purity hydrogen recovered, the amount of carbon dioxide recovered, and the energy consumption (sum total) of the compressors are shown in Table C1.

being recycled upstream of the membrane separation reformer C1. That is, the pressure booster C7 and the recycle line C106 were not provided, and the line C105 was joined to the line C113.

The heat and mass balance was determined in the same manner as in Example C1 except for the above. At this time, the permeability coefficient ratio α of the $CO_2$ separation membrane was varied, respectively, as shown in Table C2 to give Examples C5 to C8. The results are shown in Table C2.

TABLE C2

| Examples | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| C5 | 5 | 34.0 | 8.6 | 7.9 |
| C6 | 10 | 34.0 | 9.5 | 6.0 |
| C7 | 30 | 34.0 | 10.3 | 4.7 |
| C8 | 100 | 34.0 | 10.4 | 4.4 |

TABLE C3

Heat and mass balance results in Example C1

| | | C102 Product hydrogen | C103 Reformer off-gas | C104 Shift reactor outlet | C105 $H_2$ separation membrane permeated gas | C106 Recycle gas | C107 $H_2$ separation membrane off-gas | C111 $CO_2$ separation membrane off-gas | C108 $CO_2$ separation membrane permeated gas | C109 $CO_2$ liquefier inlet |
|---|---|---|---|---|---|---|---|---|---|---|
| Pressure | MPa | 0.1 | 1 | 1 | 0.1 | 1 | 1 | 1 | 0.1 | 8.0 |
| Total flow rate | kmol/h | 34.7 | 23.9 | 25.1 | 3.7 | ← | 21.4 | 10.6 | 10.8 | ← |
| CO2 | mol % | 0% | 51.3% | 53.5 | 20.3% | ← | 59.3% | 23.2% | 94.9% | ← |
| CO | mol % | 0% | 5.8% | 0.9 | 0.0% | ← | 1.0% | 2.0% | 0.1% | ← |
| H2 | mol % | 100% | 34.4% | 37.4 | 79.8% | ← | 30.2% | 56.3% | 4.4% | ← |
| CH4 | mol % | 0% | 8.5% | 8.1 | 0.2% | ← | 9.5% | 18.5% | 0.7% | ← |

TABLE C1

| Examples | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| C1 | 30 | 34.7 | 9.0 | 5.7 |
| C2 | 5 | 34.7 | 7.8 | 9.8 |
| C3 | 10 | 34.7 | 8.7 | 6.1 |
| C4 | 100 | 34.7 | 9.2 | 5.3 |

Examples C5 to C8

The permeated gas of the hydrogen separation membrane (line C105) was used as a fuel for the burner 1e instead of

Example C9

The heat and mass balance was determined for a process with the configuration shown in FIG. 7. This process includes a membrane separation reformer having the configuration as shown in FIG. 3, which is similar to Example C1.

The pre-reformer C2, which is packed with a Ru-based catalyst and performs a steam reforming reaction at an outlet temperature of 550° C. and pressure of 1 MPa, is fed with 215 kg/h of naphtha (line 200) and 946 kg/h of steam (not shown). A partially reformed gas obtained from the pre-reformer joins a recycle line C206 and is then introduced into the reforming reaction tube 1b of the membrane separation reformer C1. A nickel-based steam reforming catalyst, which is packed in the reforming reaction tube whose outlet temperature is set at 600° C., decomposes the carbon-containing fuel to produce hydrogen. At the same time, a part of the produced hydrogen permeates the hydrogen-permeable membrane 1c constituting a part of the wall of the reforming reaction tube and consisting of a Pd-based alloy and flows through the space 1*d* to yield 34.5 kmol/h of high purity hydrogen having a purity of 99.99% (line C202).

As the off-gas of the membrane separation reformer (line C203), there is obtained a mixed gas having a total gas flow rate excluding steam of 23.8 kmol/h, a $CO_2$ concentration of 49%, a CO concentration of 6%, and a hydrogen concentration of 36%. This mixed gas further passes through the shift reactor C3 packed with a Cu—Zn catalyst and operated at an outlet temperature of 300° C. and is thereby converted into a mixed gas having a $CO_2$ concentration of 52%, a CO concentration of 0.9%, and a hydrogen concentration of 39% (line C204). The resulting mixed gas is dewatered with a dewaterer (not shown) and then introduced into the $CO_2$ separation membrane C5 including a membrane having a $CO_2$/hydrogen permeability coefficient ratio α of 30. The permeation side gas (line C205) of the $CO_2$ separation membrane has a $CO_2$ concentration of 93%, which is pressurized to about 8 MPa by the compressor C7 and then fed into the $CO_2$ liquefier C6 from the line C209 to yield 9.5 kmol/h of a liquefied $CO_2$ flow (line C210). The non-permeation side gas (line C207) of the $CO_2$ separation membrane is introduced, at a pressure as it is, into the hydrogen separation membrane C4 provided with a polyimide membrane having a $CO_2$/hydrogen permeability coefficient ratio α of 0.11. On the permeation side of the hydrogen separation membrane, there is obtained 5.3 kmol/h of a gas (line C208) having a hydrogen concentration of 94% and a pressure of 0.1 MPa, which is recycled upstream of the membrane separation reformer C1 through the compressor C8 and the line C206. On the other hand, the non-permeation side gas (line C211) of the hydrogen separation membrane and the off-gas of the $CO_2$ liquefier (line C212) are combined to form a gas flow (line C213), which is sent to the reformer burner 1*e*, used as a fuel for combustion in the reformer, and then discharged (line C222).

The energy consumed by the compressors in this process is 6.1 kW/kmol-recovered $CO_2$, and the carbon dioxide recovery rate as liquefied $CO_2$ based on the amount of $CO_2$ contained in the membrane separation reformer outlet gas (line C203) is 80%.

The permeability coefficient ratio α of the carbon dioxide separation membrane, the amount of high purity hydrogen recovered, the amount of carbon dioxide recovered, and the energy consumption (sum total) of the compressors per 1 kmol of the recovered liquefied carbon dioxide are shown in Table C4. The heat and mass balance is shown in Table C6.

Examples C10 to C12

The heat and mass balance was determined in the same manner as in Example C9 except that the permeability coefficient ratio α of the membrane used for the $CO_2$ separation membrane device C5 was varied, respectively, as shown in Table C4. The permeability coefficient ratio α of the carbon dioxide separation membrane, the amount of high purity hydrogen recovered, the amount of carbon dioxide recovered, and the energy consumption (sum total) of the compressors are shown in Table C4.

TABLE C4

| Examples | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| C9 | 30 | 34.5 | 9.5 | 6.1 |
| C10 | 5 | 34.5 | 7.3 | 11.1 |
| C11 | 10 | 34.5 | 8.4 | 8.0 |
| C12 | 100 | 34.5 | 9.8 | 5.6 |

Examples C13 to C16

The permeated gas of the hydrogen separation membrane (line C208) was used as a fuel for the burner 1*e* instead of being recycled to the upstream of the membrane separation reformer C1. That is, the pressure booster C8 and the recycle line C206 were not provided, and the line C208 was joined to the line C213.

The heat and mass balance was determined in the same manner as in Example C1 except for the above. At this time, the permeability coefficient ratio α of the $CO_2$ separation membrane was varied, respectively, as shown in Table C5 to give Examples C13 to C16. The results are shown in Table C5.

TABLE C5

| Examples | α of $CO_2$ separation membrane | Recovered high purity hydrogen, kmol/h | Recovered liquefied $CO_2$, kmol/h | Energy consumed by compressor, kW/kmol-$CO_2$ |
|---|---|---|---|---|
| C13 | 5 | 34.0 | 7.2 | 8.8 |
| C14 | 10 | 34.0 | 8.1 | 6.4 |
| C15 | 30 | 34.0 | 9.0 | 4.9 |
| C16 | 100 | 34.0 | 9.1 | 4.5 |

TABLE C6

Heat and mass balance results in Example C9

| | | | | | Line No. | | | | | |
| | | C202 Product hydrogen | C203 Reformer off-gas | C204 Shift reactor outlet | C205 $CO_2$ separation membrane permeated gas | C209 $CO_2$ liquefier inlet | C207 $CO_2$ separation membrane off-gas | C208 $H_2$ separation membrane permeated gas | C206 Recycle gas | C211 $H_2$ separation membrane off-gas |
|---|---|---|---|---|---|---|---|---|---|---|
| Pressure | MPa | 0.1 | 1 | 1 | 0.1 | 8.0 | 1 | 0.1 | 1 | 1 |
| Total flow rate | kmol/h | 34.5 | 23.8 | 25.0 | 10.7 | ← | 14.3 | 5.3 | ← | 8.9 |
| CO2 | mol % | 0% | 49.3% | 51.6% | 93.3% | ← | 20.3% | 5.9% | ← | 30.0% |
| CO | mol % | 0% | 5.7% | 0.9% | 0.1% | ← | 1.5% | 0.0% | ← | 2.4% |

TABLE C6-continued

Heat and mass balance results in Example C9

| | | C202<br>Product<br>hydrogen | C203<br>Reformer<br>off-gas | C204<br>Shift<br>reactor<br>outlet | C205<br>$CO_2$<br>separation<br>membrane<br>permeated<br>gas | C209<br>$CO_2$<br>liquefier<br>inlet | C207<br>$CO_2$<br>separation<br>membrane<br>off-gas | C208<br>$H_2$<br>separation<br>membrane<br>permeated<br>gas | C206<br>Recycle<br>gas | C211<br>$H_2$<br>separation<br>membrane<br>off-gas |
|---|---|---|---|---|---|---|---|---|---|---|
| H2 | mol % | 100% | 35.8% | 38.7% | 6.0% | ← | 63.3% | 93.9% | ← | 44.9% |
| CH4 | mol % | 0% | 9.2% | 8.8% | 0.7% | ← | 14.9% | 0.2% | ← | 23.7% |

INDUSTRIAL APPLICABILITY

According to the present invention, it is possible to obtain high purity hydrogen with a purity that allows it to be fed, for example, as a fuel for a fuel cell car. On the other hand, carbon dioxide can be concentrated to a concentration suitable for the recovery in the form of liquefied carbon dioxide which is a form suitable for underground storage and undersea storage.

The invention claimed is:

1. An apparatus of hydrogen production and carbon dioxide recovery for producing hydrogen and recovering carbon dioxide from a carbon-containing fuel, the apparatus comprising:
a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane, wherein said hydrogen-permeable membrane is arranged in the reformer;
a carbon dioxide separation membrane, for separating the reformer off-gas into a carbon dioxide-enriched gas which is a gas enriched in carbon dioxide and a carbon dioxide separation membrane off-gas which is a gas enriched in components other than carbon dioxide, wherein said carbon dioxide separation membrane is arranged downstream of the reformer;
a hydrogen separation membrane for separating the carbon dioxide separation membrane off-gas into a hydrogen-enriched gas which is a gas enriched in hydrogen and a hydrogen separation membrane off-gas which is a gas enriched in components other than hydrogen, wherein said hydrogen separation membrane is arranged downstream of the carbon dioxide separation membrane; and
a recycle line for recycling the hydrogen-enriched gas upstream of the hydrogen-permeable membrane in the reformer.

2. The apparatus according to claim 1, comprising a carbon dioxide liquefier for liquefying the carbon dioxide-enriched gas to obtain liquefied carbon dioxide, wherein said carbon dioxide liquefier is arranged downstream of the carbon dioxide separation membrane.

3. The apparatus according to claim 2, wherein the carbon dioxide separation membrane has a ratio α of carbon dioxide permeability coefficient to hydrogen permeability coefficient of 5 or more.

4. The apparatus according to claim 1, wherein the carbon dioxide separation membrane has a ratio α of carbon dioxide permeability coefficient to hydrogen permeability coefficient of 5 or more.

5. An apparatus of hydrogen production and carbon dioxide recovery for producing hydrogen and recovering carbon dioxide from a carbon-containing fuel, the apparatus comprising:
a reformer provided with a hydrogen-permeable membrane for reforming the carbon-containing fuel and simultaneously separating hydrogen to obtain a hydrogen-permeable membrane permeated gas which is a gas having permeated the hydrogen-permeable membrane and a reformer off-gas which is a gas not having permeated the hydrogen-permeable membrane, wherein said hydrogen-permeable membrane is arranged in the reformer;
a carbon dioxide separation membrane, for separating the reformer off-gas into a carbon dioxide-enriched gas which is a gas enriched in carbon dioxide and a carbon dioxide separation membrane off-gas which is a gas enriched in components other than carbon dioxide, wherein said carbon dioxide separation membrane is arranged downstream of the reformer;
a hydrogen separation membrane for separating the carbon dioxide separation membrane off-gas into a hydrogen-enriched gas which is a gas enriched in hydrogen and a hydrogen separation membrane off-gas which is a gas enriched in components other than hydrogen, wherein said hydrogen separation membrane is arranged downstream of the carbon dioxide separation membrane; and
a recycle line for recycling the hydrogen-enriched gas to the hydrogen-permeable membrane in the reformer.

* * * * *